(12) United States Patent
Pewett et al.

(10) Patent No.: US 11,486,280 B2
(45) Date of Patent: Nov. 1, 2022

(54) OIL DRAINING SYSTEM

(71) Applicant: TDNT Enterprise Inc., Batavia, IL (US)

(72) Inventors: Trevor J. Pewett, Batavia, IL (US); Amir Tayyebi Moghaddam, Atlanta, GA (US); Dave Gregerson, Lawrenceville, GA (US)

(73) Assignee: TDNT Enterprise Inc., Batavia, IL (US)

( * ) Notice: Subject to any disclaimer, the term of this patent is extended or adjusted under 35 U.S.C. 154(b) by 0 days.

(21) Appl. No.: 17/646,367

(22) Filed: Dec. 29, 2021

(65) Prior Publication Data

US 2022/0120201 A1 Apr. 21, 2022

Related U.S. Application Data

(63) Continuation-in-part of application No. 16/946,576, filed on Jun. 26, 2020.

(60) Provisional application No. 63/263,378, filed on Nov. 1, 2021.

(51) Int. Cl.
| | |
|---|---|
| *F01M 11/04* | (2006.01) |
| *B01D 35/16* | (2006.01) |
| *B01D 35/00* | (2006.01) |

(52) U.S. Cl.
CPC ....... *F01M 11/0458* (2013.01); *B01D 35/005* (2013.01); *B01D 35/16* (2013.01); *B01D 2201/34* (2013.01)

(58) Field of Classification Search
CPC ... F01M 11/0458; B01D 35/005; B01D 35/16
See application file for complete search history.

(56) References Cited

U.S. PATENT DOCUMENTS

| | | | |
|---|---|---|---|
| 2,376,756 A | 5/1945 | Bye | |
| 4,177,529 A | 12/1979 | Sikula, Jr. | |
| 5,299,714 A | 4/1994 | Kilgore | |
| 5,598,951 A * | 2/1997 | DeBano, Jr. ............ | B67C 11/02 222/88 |

(Continued)

OTHER PUBLICATIONS

International Search Report and Written Opinion in International Application No. PCT/US2021/039096, dated Sep. 29, 2021 (8 pages).

*Primary Examiner* — Kevin A Lathers
(74) *Attorney, Agent, or Firm* — Michael Best & Friedrich LLP

(57) ABSTRACT

A system includes an oil catch compartment, at least one magnetic stud or rod, a motor compartment, and a switch. The oil catch compartment includes a first end configured for coupling to an oil filter. The at least one magnetic stud or rod is positioned along a sidewall of the oil catch compartment. The motor compartment includes a gearbox shaft and a puncturing device. The gearbox shaft is telescopically coupled to a second end of the oil catch compartment. The puncturing device is coupled to the gearbox shaft and positioned at least partially within the housing of the motor compartment or the oil catch compartment. The switch is formed on an outside surface of a battery compartment and communicatively connected to a motor coupled to the gearbox shaft. The switch is actuatable to cause the motor to advance the puncturing device via the gearbox shaft.

20 Claims, 15 Drawing Sheets

(56) References Cited

U.S. PATENT DOCUMENTS

| | | | |
|---|---|---|---|
| 5,694,990 A | 12/1997 | Crima | |
| 5,921,292 A | 7/1999 | Fotus | |
| 6,880,252 B1 * | 4/2005 | Drake | B25C 7/00 |
| | | | 30/366 |
| 8,651,134 B1 * | 2/2014 | Kurtz | F16N 31/00 |
| | | | 141/330 |
| 10,138,773 B2 * | 11/2018 | Dosky | F01M 11/03 |
| 2009/0308464 A1 | 12/2009 | Cesarz | |
| 2012/0267006 A1 | 10/2012 | Liao | |

* cited by examiner

OIL DRAINING SYSTEM

CROSS-REFERENCE TO RELATED APPLICATIONS

This application is a continuation-in-part of U.S. patent application Ser. No. 16/946,576, filed on Jun. 26, 2020, which is hereby incorporated by reference herein in its entirety. This application also claims priority to and the benefit of U.S. Provisional Patent Application No. 63/263,378, filed on Nov. 1, 2021, which is hereby incorporated by reference herein in its entirety.

FIELD OF THE INVENTION

The present disclosure relates to systems and methods for removing oil, and more specifically, to systems and methods for removing oil from an oil filter in a motor vehicle.

BACKGROUND

The process of draining oil from an oil filter in a motor vehicle or agriculture equipment may take up an excessive amount of time, not only for an individual changing their own oil, but also for an experienced professional striving for efficiency. The conventional systems and methods for oil change can also cause spills of heated oil, which can potentially cause injury (e.g., due to the heat and material composition of the oil). In addition, coming into contact with heated oil can cause painful burns on the skin. There are also many components involved during an oil change, such as the drain plug, the drain plug seal, the oil filter itself, and the rubber seal that is attached to the top of the oil filter, all of which need to be tracked. Heated oil entering a catch pan may splatter or spill even if a user attempts to direct the oil at the catch pan. Thus, the oil may still burn the skin of the user or create a mess, even if the oil filter was positioned directly above the catch pan.

Additionally, the oil may be difficult to remove from surfaces, especially if the surfaces absorb the oil. Often times, many additional materials such as towels, wipes, and other papers are used to prevent these messes, and to clean after they occur. Time spent on cleaning the area where the oil removal process occurred may also take an excessive amount of time, and the areas can remain tainted with remnants from the oil draining process. This may also produce excess waste due to the cleaning supplies and materials used and disposed.

SUMMARY

The following presents a simplified summary of one or more implementations in order to provide a basic understanding of present technology. This summary is not an extensive overview of all contemplated implementations of the present technology, and is intended to neither identify key or critical elements of all examples, nor delineate the scope of any or all aspects of the present technology. Its sole purpose is to present some concepts of one or more examples in a simplified form as a prelude to the more detailed description that is presented later.

According to some implementations of the present disclosure, a system includes an oil catch compartment, at least one magnetic stud or rod, a motor compartment, and a switch. The oil catch compartment includes a first end and a second end. The first end is configured for coupling to an oil filter. The at least one magnetic stud or rod is positioned along a sidewall of the oil catch compartment. The motor compartment includes a gearbox shaft and a puncturing device. The gearbox shaft is telescopically coupled to the second end of the oil catch compartment. The puncturing device is coupled to the gearbox shaft and positioned at least partially within the housing of the motor compartment or the oil catch compartment. The switch is formed on an outside surface of a battery compartment and communicatively connected to a motor coupled to the gearbox shaft. The switch is actuatable to cause the motor to advance the puncturing device via the gearbox shaft, such that the puncturing device alternates between (i) a first position that is retracted from the first end of the oil catch compartment and (ii) a second position that protrudes from the first end of the oil catch compartment.

In some implementations, the system further includes a flexible oil hose coupled to the sidewall of the oil catch compartment. In some such implementations, the flexible oil hose is removably coupled to the oil catch compartment.

In some implementations, the oil catch compartment includes a protruding opening for attaching a flexible oil hose. The protruding opening is formed on the sidewall of the oil catch compartment.

In some implementations, the switch is actuatable to cause the puncturing device to rotate, thereby advancing the puncturing device.

In some implementations, the puncturing device includes a drill bit. The puncturing device further includes a rod that is coupled to the drill bit and the gearbox shaft at two opposing ends of the rod. At the first position, the drill bit is housed entirely within the oil catch compartment.

In some implementations, the sidewall extends from the first end to the second end of the oil catch compartment.

In some implementations, the system further includes a tubular sleeve having a corresponding slot for receiving each of the at least one magnetic stud or rod. In some such implementations, at least a portion of the tubular sleeve includes at least a portion of the sidewall of the oil catch compartment. In some other such implementations, the tubular sleeve is configured to wrap outside the sidewall of the oil catch compartment.

In some implementations, the sidewall of the oil catch compartment forms a hollow housing. In some such implementations, the system further includes a rubber gasket seal coupled to a top of the hollow housing. The rubber gasket seal is configured to provide direct contact and a liquid-tight seal with the oil filter.

In some implementations, the motor compartment further includes a compression spring coupled to the gearbox shaft and enclosing at least a portion of the puncturing device. The compression spring is configured to urge the puncturing device to return to the first position from the second position.

According to some implementations of the present disclosure, a method for draining oil from an oil filter is disclosed as follows. The method provides for attaching a first end of an oil catch compartment of an oil draining system to the oil filter. The method further provides for allowing at least one magnetic stud or rod of the oil draining system to hold onto the oil filter. The at least one magnetic stud or rod is positioned along a sidewall of the oil catch compartment of an oil draining system. The method further provides for actuating a switch to cause a motor to advance a puncturing device of the oil draining system via a gearbox shaft, such that the puncturing device alternates from a first position that is retracted from the first end of the oil catch compartment to a second position that protrudes from the first end of the oil catch compartment.

In some implementations, the method further provides for retracting the puncturing device from the second position to the first position, thereby allowing oil to drain from the oil filter to the oil catch compartment. In some such implementations, the oil draining system further includes a flexible oil hose coupled to the sidewall of the oil catch compartment, such that the oil further drains out of the flexible oil hose. In some implementations, the switch further causes the puncturing device to retract from the second position to the first position. In some implementations, the oil draining system further includes a compression spring coupled to the gearbox shaft and enclosing at least a portion of the puncturing device. The compression spring is then configured to urge the puncturing device to retract to the first position from the second position.

In some implementations, the gearbox shaft is telescopically coupled to the second end of the oil catch compartment. In some implementations, the puncturing device includes a rod that is coupled to a drill bit and the gearbox shaft at two opposing ends of the rod; and at the first position the drill bit is housed entirely within the oil catch compartment.

The above summary is not intended to represent each embodiment or every aspect of the present invention. Additional features and benefits of the present invention are apparent from the detailed description and figures set forth below.

BRIEF DESCRIPTION OF THE DRAWINGS

Other advantages of the invention will become apparent upon reading the following detailed description and upon reference to the drawings in which.

Figure 1:
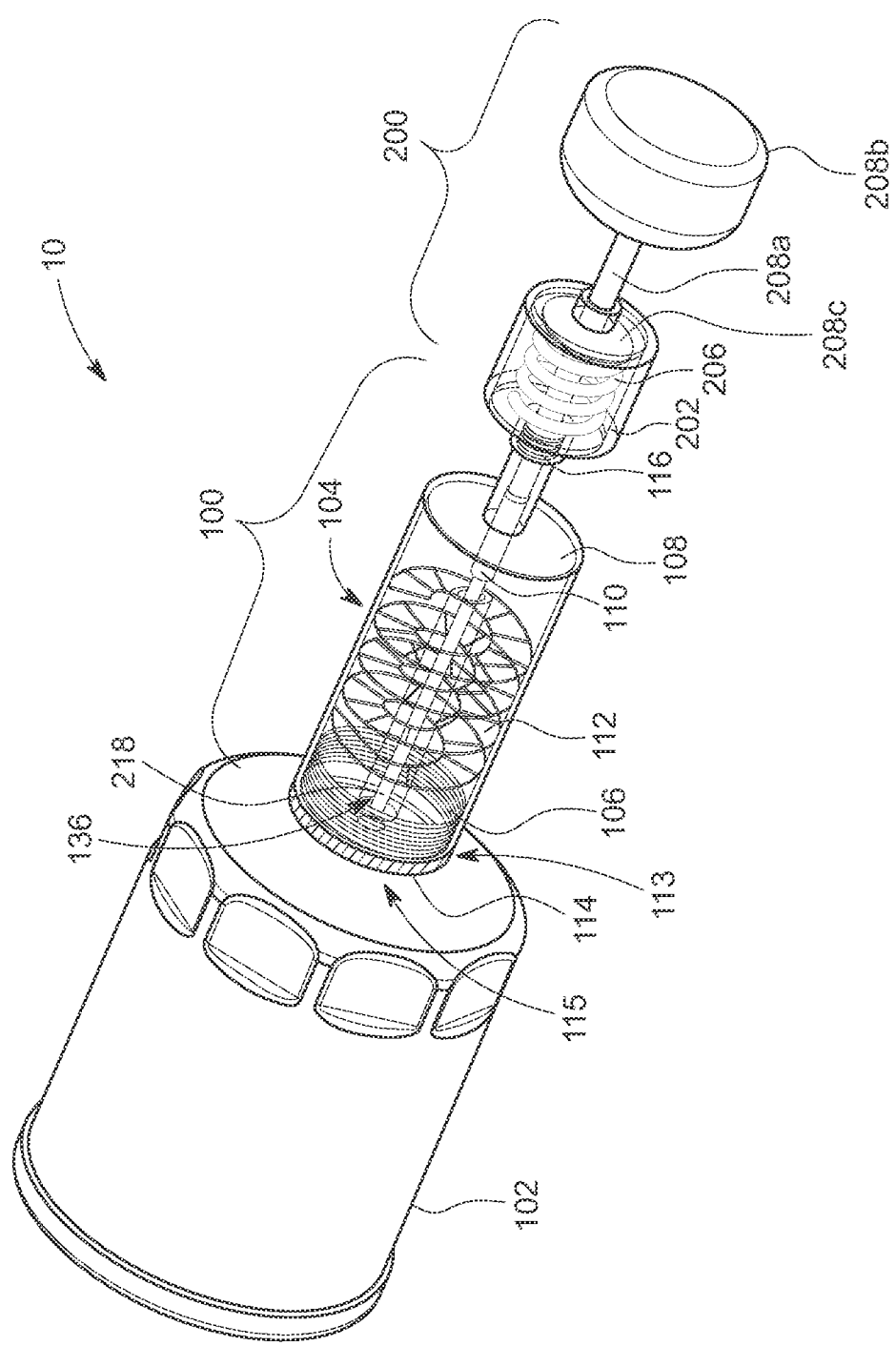
FIG. 1 illustrates an isometric view of a system for removing and/or draining oil from an oil filter, according to some implementations of the present disclosure.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present disclosure is described with reference to the attached figures, wherein like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As disclosed herein, removing and/or draining oil from an oil filter often causes skin burns and/or excess mess. As a result, many cleaning materials are used, which are disposed of into the environment. Additionally, the process is often time consuming, which can cause delays in other parts of the oil changing process. Desirable aspects of the present disclosure include systems and assemblies that can (i) reduce the number of steps in the oil removal process, and/or (ii) automate the oil removal process. The disclosed systems and assemblies not only save time, but also reduce potential damage and waste resulting from the oil removal and/or draining process. In some implementations, the systems and assemblies described herein (i) reduce time spent in the process, (ii) prevent injury to the users, (iii) protect surface areas in the surroundings, and (iv) are environmentally friendly.

Aspects of the present disclosure include an oil draining system that can provide a user with a tool that removes and/or drains oil without coming into contact with the heated oil. The oil draining system causes little spillage and/or leakage of the heated oil. In some implementations, a user of the oil draining system may be a lay individual who is changing, removing, and/or draining oil from their own vehicle. In some implementations, the user of the oil draining system may have some experience ranging from a new technician to an experienced professional technician.

Thus, the disclosed oil draining system allows a user and their workspace to remain burn-free and cleaner, while still producing the same results of an oil removal process. In some implementations, the oil removal process can optionally include removing and/or draining the oil cap and removing the drain plug. Removing the drain plug may require quick movement into the catch pan underneath the drain plug while the user is under the vehicle, and locating the washer on the drain plug to ensure it is also removed. In some implementations, the catch pan can include, but is not limited to, a container, a bin, a pan, a tray, or a combination thereof.

Furthermore, in some implantations, oil draining system allows the user to avoid the tricky step of applying enough pressure to remove the drain plug, while still keeping enough distance between the user and drain plug, all while ensuring the catch pan is positioned such that the oil being removed and/or drained from the filter is directed at the catch pan before pressure is lifted from the drain plug. The oil draining system allows a user to remove and/or drain the oil from the filter in a way that minimizes risk of being burned by the heated oil. The oil draining system also provides for reduced cleaning time, and an environmentally friendly solution in the clean-up process.

According to some implementations of the present disclosure, a system for removing oil from an oil filter of a motor vehicle or agriculture equipment is disclosed. The system includes a housing, an upper cap, and a lower cap. The housing defines a top rim, an upper portion, a lower portion, and a bottom rim. The top rim has a first diameter. The bottom rim has a second diameter that is less than the first diameter. The upper cap includes a flange with a first side and an opposing second side. The flange is disposed at a top portion of the upper cap. The first side of the flange is coupled to the top rim of the housing. The second side of the flange is couplable to the oil filter. A bottom portion of the upper cap extends into the housing. The upper cap includes a central aperture for draining the oil from the oil filter into the housing. The lower cap is coupled to the bottom rim of the housing.

In some implementations, the upper portion of the housing defines a taper, from the top rim toward the lower portion of the housing. The lower portion of the housing is generally cylindrical.

In some implementations, the upper portion of the housing includes a hollow conical frustum. The lower portion of the housing includes a hollow cylinder with open ends. The hollow cylinder extends below the conical frustum of the upper portion of the housing.

In some implementations, the second side of the upper cap is concave for directing the oil from the oil filter toward the central aperture of the upper cap.

In some implementations, the system further includes a puncture device removably coupled to the lower cap. At least a portion of the puncture device extends through the lower cap into a void of the upper cap. In some implementations, the at least a portion of the puncture device includes a drill bit. In some implementations, the lower cap includes an internal seal. The puncture device is configured to penetrate the internal seal of the lower cap and extend into the housing, while substantially being leak-proof between the puncture device and the internal seal of the lower cap. In some implementations, the puncture device is configured to extend further through the upper cap and out of the second side of the upper cap.

In some implementations, the system further includes a hollow tube removably coupled to the lower cap. The hollow tube includes a proximal tip for puncturing the lower cap, thereby allowing removal of the oil from the oil filter. In some implementations, the hollow tube includes a puncture device at a proximal end of the hollow tube. The puncture device is configured to extend through the lower cap.

In some implementations, the lower portion of the housing includes a third diameter that is equal to the second diameter of the bottom rim.

In some implementations, a longitudinal cross-section of the upper cap is generally "T" shaped. In some such implementations, a transverse cross-section of the upper cap is generally "O" shaped.

In some implementations, the system further includes a gasket with a first side and an opposing second side. The first side of the gasket is coupled to the second side of the upper cap. The second side of the gasket is couplable to the oil filter. In some such implementations, the gasket is substantially circular.

According to some implementations of the present disclosure, a system for removing oil from an oil filter of a motor vehicle or agriculture equipment is disclosed. The system includes a housing, an upper cap, and a lower cap. The housing defines a top rim, a body portion, and a bottom rim. The body portion of the housing is generally cylindrical. The upper cap includes a flange with a first side and an opposing second side. The flange is disposed at a top portion of the upper cap. The first side of the flange is coupled to the top rim of the housing. The second side of the flange is couplable to the oil filter. A bottom portion of the upper cap extends into the housing. The upper cap includes a central aperture for draining the oil from the oil filter into the housing. The lower cap is coupled to the bottom rim of the housing.

FIG. 1 illustrates an example oil draining system 10 for removing and/or draining oil from an oil filter of a motor vehicle or agriculture equipment, according to some implementations of the present disclosure. The system 10 includes a containment device 100 and a removable puncture assembly 200. In some implementations, the containment device 100 includes a housing 104, an upper cap 106, a lower cap 108, an inner shaft 110, a spiral support 112, a gasket 114, and a seal 116.

The containment device 100 is removably coupled to an oil filter 102 of a vehicle. This connection may be through a temporary and/or removable connection to the oil filter 102, such as suction, magnetic coupling, nuts and bolts, clamps, or another method that temporarily and/or removably couples the containment device 100 to the oil filter 102. In some implementations, a portion of the containment device 100 may encapsulate a portion of the oil filter 102. For example, the portion of the containment device 100 may wrap around the portion of the oil filter 102.

The alignment between the oil filter 102 and the containment device 100 can be determined according to the orientation of the oil filter 102 relative to the direction of gravity. For example, a longitudinal axis through the containment device 100 is preferably along the direction of gravity. As shown, in some implementations, the oil filter 102 and the containment device 100 are aligned, such that the longitudinal axis through the containment device 100 is parallel to a longitudinal axis through the oil filter 102. In some other implementations, the connection between the oil filter 102 and the containment device 100 may be tilted, such that the longitudinal axis through the containment device 100 is at an angle to the longitudinal axis through the oil filter 102.

In some implementations, the containment device 100 may be temporarily and/or removably coupled to a side of the oil filter 102. In some implementations, the containment device 100 may be magnetically coupled to the oil filter 102. In some implementations, the interface of the containment device 100 and the oil filter 102 is sealed using a gasket 114 to prevent leakage in changing, removing and/or draining the oil to avoid unnecessary burns or mess. For example, in some implementations, the gasket 114 is coupled to the upper cap 106 on a first side 113 of the gasket 114, and the gasket 114 is couplable to the oil filter 102 on an opposite side 115 of the gasket 114. In some such implementations, the gasket 114 can include any type of polymer seal, Teflon tape, or both. The gasket 114 may also vary in size. For example, in some implementations, the gasket 114 includes a diameter of 1⅞ inch and a depth of 1/16 inch. In some implementations, the gasket 114 is substantially circular.

The containment device 100 is also temporarily and/or removably coupled to the puncture assembly 200. This connection between the containment device 100 and the puncture assembly 200 can also be substantially sealed to avoid unnecessary burns and/or mess due to potential spilling and/or leaking of oil. The connection between the containment device 100 and the puncture assembly 200 may be made using threads, seals, gaskets, and/or any other mechanism that ensures (i) a removable connection and (ii) a substantially leak-proof seal. For example, the seal 116 of the containment device 100 is capable of providing such a removable and substantially leak-proof connection. The seal 116 may be made of a material the same as, or similar to, the gasket 114 of the containment device 100.

In some implementations, the housing 104 can also include the spiral support 112 and the inner shaft 110. Thus, in some such implementations, the spiral support 112 defines an inner diameter that may allow the inner shaft 110 to fit through the spiral support 112. Additionally, or alternatively, in some such implementations, the inner shaft 110 has an external diameter that is smaller than the inner diameter of the spiral support 112. For example, in some implementations, the inner shaft 110 may include the diameter of ⅛ inch, and a length of 1½ inches.

The spiral support 112 may be in a generally spiral shape, or any shape to induce oil movement within the housing 104 and/or allow for easier passage of the oil. In some implementations, the spiral support 112 may be a mechanism that rotates to promote and/or multiply torque. In some other implementations, the spiral support 112 may be stationary and/or solely provide support to the inner shaft 110 in maintaining its position within the housing 104. In some implementations, the spiral support 112 may be coupled to and/or extend from the inner walls of the housing 104.

In some implementations, the spiral support 112 may include an outer diameter that is the same as, or less than, the inner diameter of the housing 104. For example, in some such implementations, the spiral support 112 may include a diameter of ½ inch, and a length of three inches. The spiral support 112 and the inner shaft 110 may be made of the same or similar material as the housing 104.

In some implementations, the puncture assembly 200 includes an encapsulator 202, a spring 206, a handle shaft 208a, a handle bar 208b, and a handle flange 208c. The encapsulator 202 may be made of the same or similar components as the housing 104. The encapsulator 202 may include any suitable dimensions. For example, in some implementations, the encapsulator 202 includes a diameter of 1⅞ inch, and a length of three inches. The spring 206 may be positioned in an interior of the encapsulator 202. The spring 206 can also include any suitable dimensions. For example, in some implementations, the spring 206 may be a 4-coil spring that is ⅛ inch thick. Thus, in some implementations, when the puncture assembly 200 is coupled to the containment device 100, the seal 116 of the containment device 100 may be positioned between the handle shaft 208a and the inner shaft 110 of the containment device 100.

In some implementations, the puncture assembly 200 is temporarily and/or removably coupled to the containment device 100. In some other implementations, the puncture assembly 200 is semi-permanently coupled to the containment device 100. In some implementations, the handle shaft 208a can fit into the spring 206, and can be coupled to the handle bar 208b. The handle shaft 208a and the handle bar 208b may be made of a polymer or metal similar to the housing 104.

In some implementations, the puncture assembly 200 further includes a puncture device 218. In some such implementations, the puncture device 218 is coupled to and/or integral with the handle shaft 208a. In some implementations, when the puncture assembly 200 is coupled to the containment device 100, at least a portion of the puncture device 218 extends through the seal 116 of the lower cap 108 into a void of the upper cap 106. In some implementations, at least a portion of the puncture device 218 includes a drill bit as the tip. In some other implementations, the handle shaft 208a punctures through the seal 116 of the lower cap 108, such that the handle shaft 208a abuts the inner shaft 110.

In some implementations, the containment device 100 includes the puncture device 218 instead. The puncture device 218 can be coupled to and/or integral with the inner shaft 110 of the containment device 100. In some such implementations, the handle shaft 208a transfers pressure to the inner shaft 110 and/or the puncture device 218, which assists the puncture device 218 in puncturing the oil filter 102. Additionally, or alternatively, the puncture device 218 is coupled to the spiral support 112. In some such implementations, the handle shaft 208a transfers pressure to the spiral support 112, which in turn rotates the puncture device 218 upwards to puncture the oil filter 102.

Figure 2:
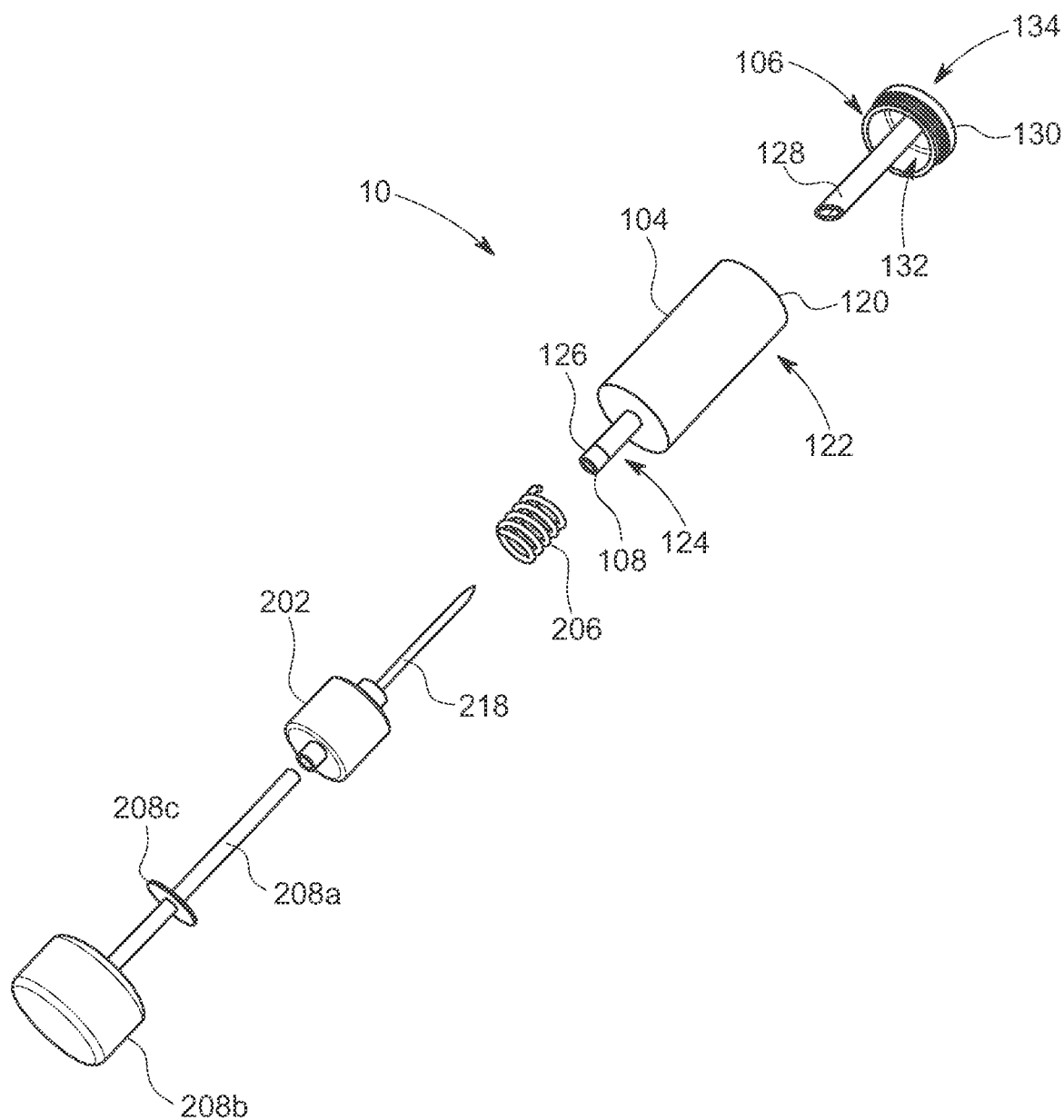
FIG. 2 illustrates an exploded view of the system of FIG. 1, according to some implementations of the present disclosure.
Figure 4:
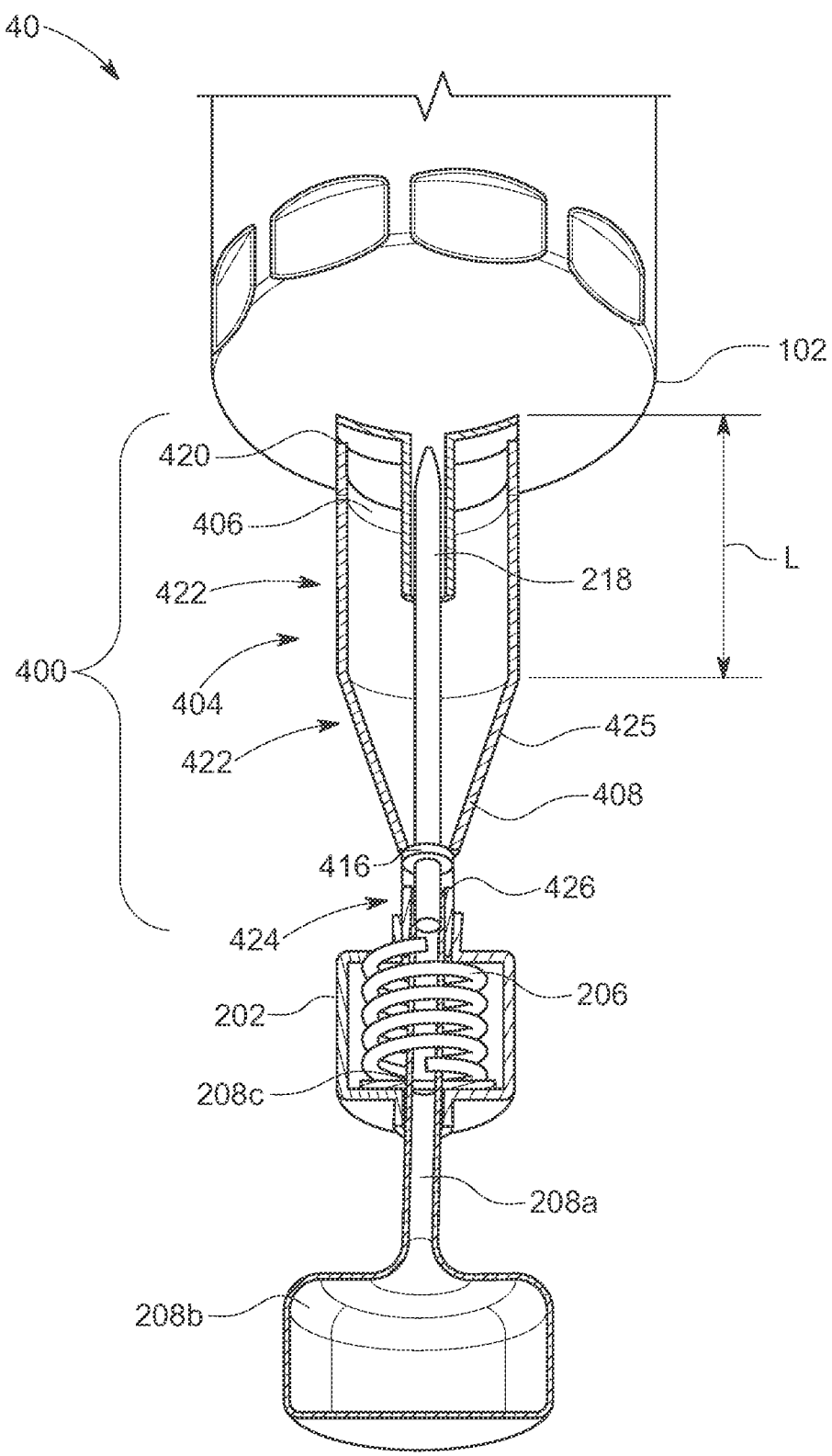
FIG. 4 illustrates a cross-sectional view of an alternative system for removing and/or draining oil from an oil filter, according to some implementations of the present disclosure.

Referring now to FIG. 2, an exploded view of the system 10 is depicted, according to some implementations of the present disclosure. As shown, the housing 104 includes a top rim 120, an upper portion 122, a lower portion 124, and a bottom rim 126. In some implementations, the upper portion 122 of the housing 104 is generally cylindrical. In some other implementations, the upper portion 122 of the housing 104 includes a hollow conical frustrum (e.g., the housing 404 as shown in FIG. 4). The lower portion 124 of the housing 104 includes a hollow cylinder with open ends. The lower portion 124 extends below the upper portion 122 of the housing 104.

In some implementations, the diameter and/or width of the housing 104 is greater than the diameter and/or width of the bottom rim 126. Other dimensions of the housing 104 may vary. In some implementations, the lower portion 124 of the housing 104 may include a diameter and/or width that is equal to the diameter and/or width of the bottom rim 126. The housing 104 may be made of metal (e.g., aluminum or steel), a polymer (e.g., polyethylene or polytetrafluoroethylene), or any material capable of withstanding a temperature of at least 230 degrees Fahrenheit, at least 240 degrees Fahrenheit, at least 250 degrees Fahrenheit, or at least 270 degrees Fahrenheit. In some implementations, the housing 104 may include an insulated wall in a double vacuum.

In some implementations, the containment device 100 also includes the upper cap 106 with a flange 130. The flange 130 is disposed at a top portion of the upper cap 106. The flange 130 includes a first side 132 and an opposing second side 134. The first side 132 of the flange 130 may be coupled to the top rim 120 of the housing 104. The second side 134 of the flange 130 may be couplable to the oil filter 102 (FIG. 1). A bottom portion 128 of the upper cap 106 may extend into the housing 104. In some implementations, the upper cap 106 includes a central aperture 136 (FIG. 1) for draining the oil from the oil filter 102 into the housing 104. In some implementations, the second side 134 of the upper cap 106 is concave for directing the oil from the oil filter 102 toward the central aperture 136 (FIG. 1) of the upper cap 106.

In some implementations, the upper cap 106 may include a diameter of two inches, and a height of ¼ inch, with the central aperture 134 of ½ inch in diameter. The upper cap 106 may have two different cross-sections. A first cross-section (e.g., longitudinal cross-section) of the upper cap 106 may be taken as shown in the view depicted in FIGS. 3A-C, and includes a general "T" shape. A second cross-section (e.g., transverse cross-section) of the upper cap 106 may be taken from an angle perpendicular to the first cross-section, along the length of the upper cap 106, and includes a general "O" shape.

In some implementations, the portion of the upper cap 106 that is concentric with the inner shaft 110 may include voids to allow for the passage of oil from the upper cap 106 into the hollow portion of the housing 104. The voids may be any size or shape, so long as the upper cap 106 maintain its semi-rigid structure. In some implementations, the upper cap 106 is couplable to oil filter 102 with or without the gasket 114 in-between. In some implementations, the upper cap 106 is magnetically couplable to a metal oil filter (e.g. the oil filter 102), such that the housing 104 maintains its position as coupled to the oil filter 102 without additional pressure applied by the user (referred to as using a push-button method). In some implementations, where there is the gasket 114 between the oil filter 102 and upper cap 106, the gasket 114 aids in preventing leaks between the oil filter 102 and the upper cap 106.

In some implementations, the lower cap 108 is coupled to the bottom rim 126 of the housing 104. The lower cap 108 may be made with an elastomer or polymer type of material, such as rubber, that sustains its form and may remain liquid tight even if punctured with a sharp item. In some implementations, the lower cap 108 may include the seal 116 as an internal component of the lower cap 108. Thus, in some implementations, the seal 116 may be punctured and reseal upon release.

Additionally, in some implementations, the seal 116 can be reused and maintain its resealing characteristics. For example, in some implementations, the seal 116 can be reused for three times, four times, five times, ten times, or indefinitely. For example, the seal 116 may include a sealing mechanism such that, even after being punctured by the puncture device 218, liquid does not spill and/or leak out of the seal 116 from the interior of the containment device 100, even after the puncture device 218 is removed from the containment device 100 (e.g., the puncture device 218 no longer extends through the seal 116).

In some implementations, the puncture device 218 is configured to penetrate the seal 116 of the lower cap 108, and extend into the housing 104, while substantially being leak-proof between the puncture device 218 and the seal 116 of the lower cap 108. In some implementations, the puncture device 218 is further configured to extend further through the upper cap 106, and out of the second side 134 of the upper cap 106.

Additionally, or alternatively, in some implementations, the internal seal 116 of the lower cap 108 can be reused for at least two times, allowing coupling and decoupling of the puncture device 218. The lower cap 108 may vary in size and/or may be threaded in the center. For example, in some implementations, the lower cap 108 includes a diameter of two inches, and height of ¼ inch, with a ½ inch center hole. In some implementations, the lower cap 108 and/or the seal 116 is replaceable. Thus, in some implementations, for each use, a user may change the lower cap 108 and/or the seal 116 to ensure proper sealing between the lower cap 108 and the encapsulator 202 of the puncture assembly 200.

In some implementations, the puncture device 218 may include a sharp end for contacting and causing a breakage in the oil filter 102 to allow for draining the oil. The puncture device 218 can include a drill bit, sharpened metal, step bit, center punch, nail, screw, or combinations thereof. In some implementations, a rotation method for applying pressure to cause the oil filter 102 to be punctured may be used, especially if a drill bit or step bit is used.

In some implementations, the spring is positioned inside or internal to the encapsulator 202 to urge the handle bar 208*b* to return to its original position after being pushed up by a user. In some implementations, the handle shaft 208*a* also includes the handle flange 208*c* located between the handle shaft 208*a* and the handle bar 208*b*. When assembled, the handle flange 208*c* is positioned within the encapsulator 202 to prevent the handle shaft 208*a* from falling out of the encapsulator 202.

Figure 3A:
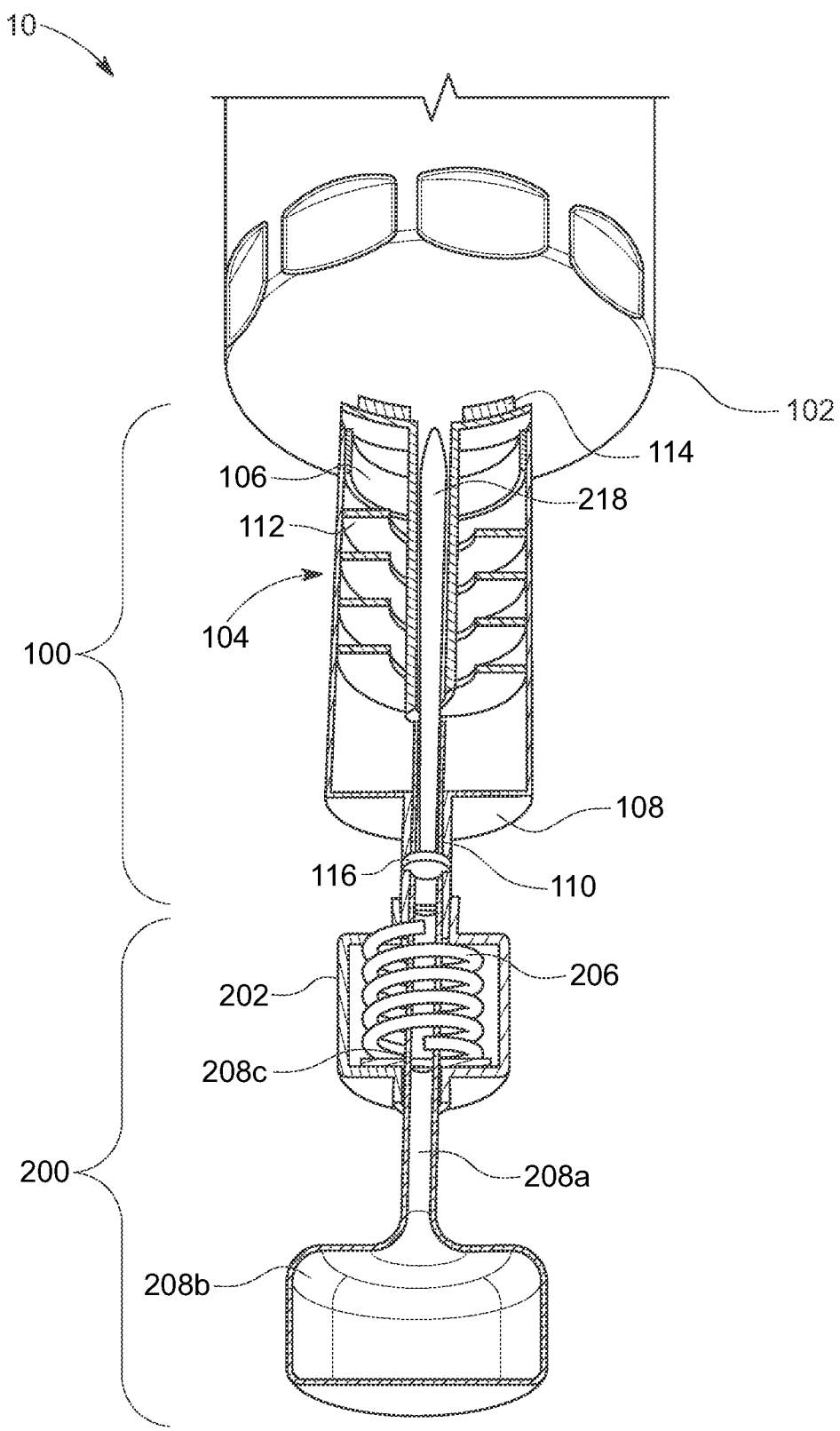
FIG. 3A illustrates a cross-sectional view of the system of FIG. 1 in a first position, according to some implementations of the present disclosure.

Referring to FIG. 3A, a first position (e.g., pre-puncture) in the process of using the system 10 for removing and/or draining oil is depicted. The system 10 in FIG. 3A is the same as, or similar to, the system 10 in FIGS. 1-2, where identical reference numbers refer to identical components. The containment device 100 is coupled to the oil filter 102, with the gasket 114 in-between. The containment device 100 is also coupled to the puncture assembly 200, at the first position, where the spring 206 is not compressed. In the example shown in FIG. 3A, at least a portion of the handle shaft 208*a* is encapsulated by the encapsulator 202.

Figure 3B:
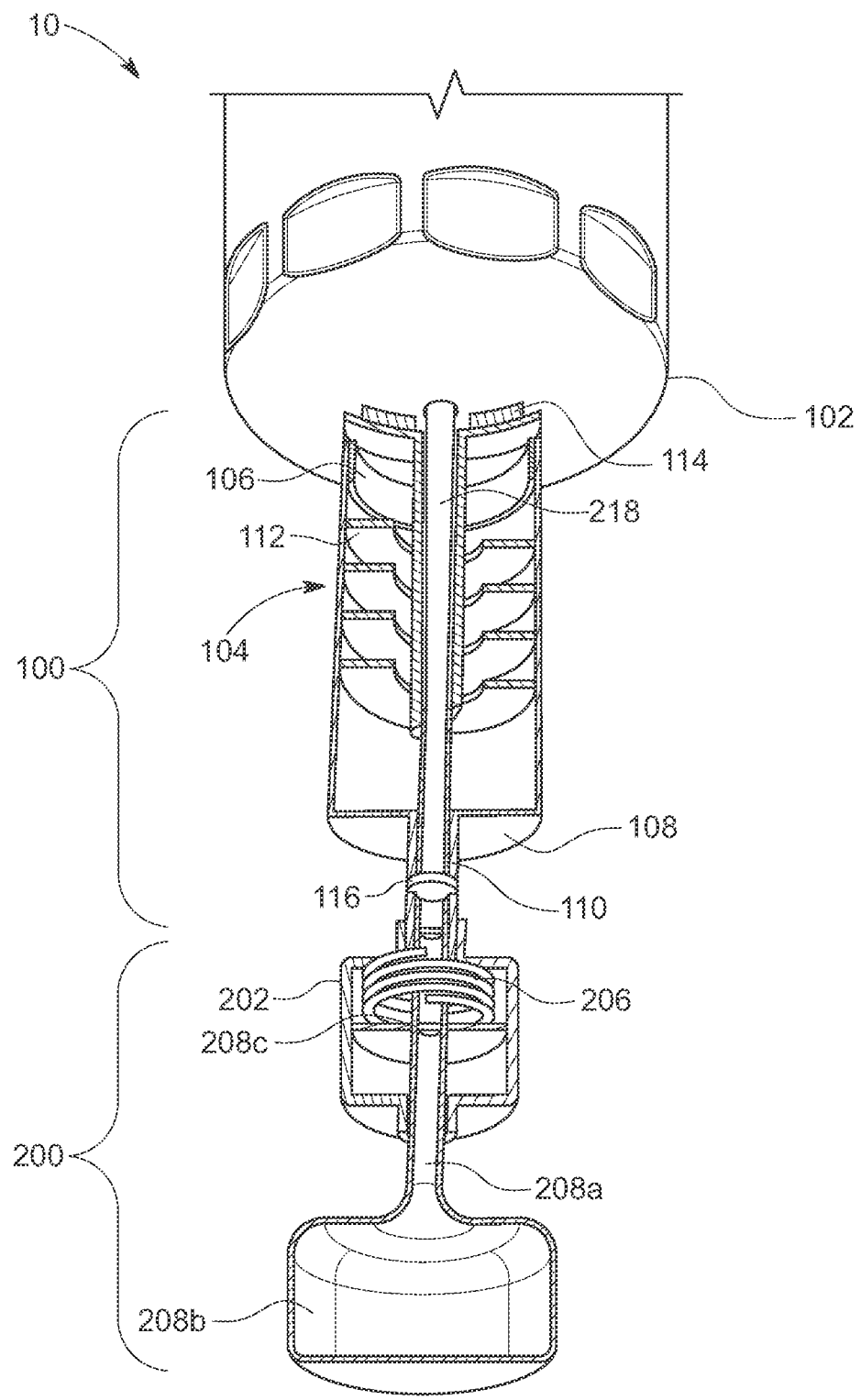
FIG. 3B illustrates a cross-sectional view of the system of FIG. 1 in a second position, according to some implementations of the present disclosure.

Referring to FIG. 3B, a second position (e.g., during puncture) in the process of using the system 10 for removing and/or draining oil is depicted. The system 10 in FIG. 3B is the same as, or similar to, the system 10 in FIGS. 1-3A, where identical reference numbers refer to identical components. As pressure is applied to the handle bar 208*b*, the length of handle shaft 208*a* may be moved farther into the interior of the encapsulator 202, such that the length of the puncture device 218 is moved inside the housing 104. As a result, the puncture device 218 punctures and/or extends through the oil filter 102.

In some implementations, the spring 206 compresses during this process in order to absorb any vibrations in the application or release of pressure on the handle bar 208*b*. In some implementations, the compression of the spring 206 is due to the handle flange 208c applying pressure in a direction toward the oil filter 102. Thus, the configuration (as shown in FIG. 3B) biases the spring 206 against an internal surface of the encapsulator 202, thereby urging the spring 206 to compress.

Figure 3C:
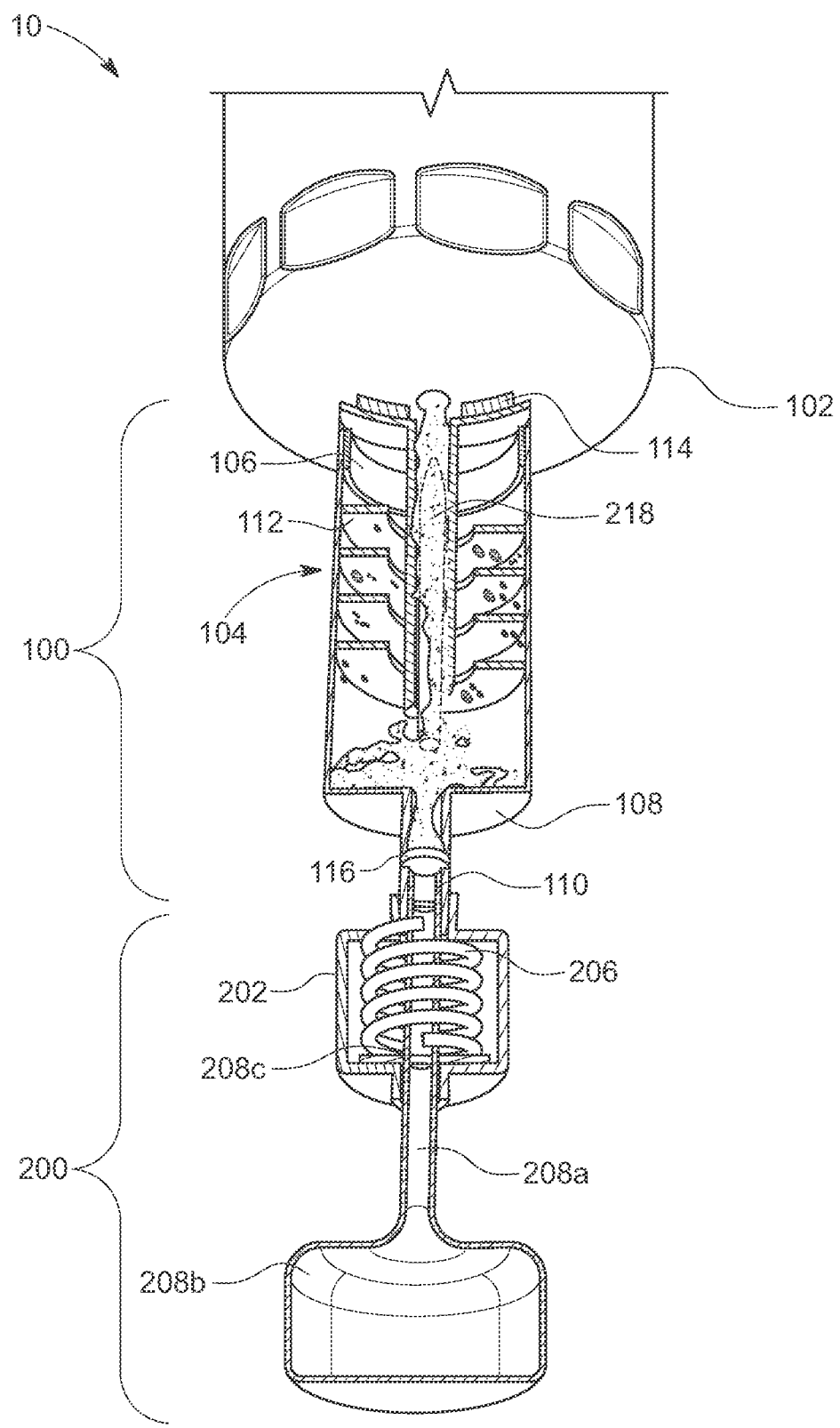
FIG. 3C illustrates a cross-sectional view of the system of FIG. 1 in a third position, according to some implementations of the present disclosure.

Referring to FIG. 3C, a third position (e.g., post-puncture) in the process of using the system 10 for removing and/or draining oil is depicted. The system 10 in FIG. 3C is the same as, or similar to, the system 10 in FIGS. 1-3B, where identical reference numbers refer to identical components. Pressure on the handle bar 208b may be released after sufficient pressure is applied such that the oil filter 102 is punctured (FIG. 3B). In some implementations, the spring 206 urges the handle bar 208b to return to its pre-puncture position (e.g., FIG. 3A), which is the same as the post-puncture position (FIG. 3C). Additionally, or alternatively, the spring 206 returns to a relaxed position and absorbs any resulting vibrations form the release of pressure to the handle bar 208b.

After the puncture device 218 punctures the oil filter 102 and/or the puncture device 218 is moved out of the oil filter 102, oil may flow from the oil filter 102 into the housing 104 of the containment device 100. In some implementations, the spiral support 112 may also aid and/or direct the oil to move to the bottom portion of the housing 104. In some implementations, the spiral support 112 may enhance the flow of oil from the oil filter 102 due to a created pump from the pressure of the spiral support 112.

In some implementations, an automated system may be used for applying pressure to the puncture device 218. In some such implementations, the handle shaft 208a and handle bar 208b may be replaced with a mechanism that automatically induces the puncture device 218 to apply pressure to the oil filter 102. The automated mechanism may be activated using a handheld device coupled to an actuator. For example, in some implementations, instead of the handle shaft 208a and/or the handle bar 208b, the puncture assembly 200 may include a hydraulic actuator, a pneumatic actuator, an electric actuator, a mechanical actuator, or any combination thereof.

While the containment device 100 is depicted in FIGS. 1-3C as including the housing 104, the upper cap 106, the lower cap 108, the inner shaft 110, the spiral support 112, the gasket 114, and the seal 116, a containment device of the present disclosure can include more or fewer components. For example, FIG. 4 illustrates the first alternative containment device 400.

While the puncture assembly 200 is depicted in FIGS. 1-3C as including the encapsulator 202, the spring 206, the handle shaft 208a, and the handle bar 208b, the puncture assembly 200 can include more or fewer components. For example, a first alternative puncture assembly can include the encapsulator 202, the spring 206, the handle shaft 208a, an ergonomic handle bar, and the handle flange 208c. In some such implementations, the ergonomic handle bar may include being shaped as the negative extrusion of a gripped hand on the handle bar, for use with the push-button method. In some such implementations, the ergonomic handle bar may be engulfed by gel sleeve. As another example, a second alternative puncture assembly can include the encapsulator 202, a memory foam insert, the handle shaft 208a, the handle bar 208b, and the handle flange 208c. In some such implementations, the memory foam insert takes the place of the spring in absorbing the shock from the system when the pressure is released.

Referring to FIG. 4, a cross-sectional view of another example system 40 is depicted, according to some implementations of the present disclosure. The system 40 is the same as, or similar to, the system 10 as shown in FIGS. 1-3C, where like reference numbers refer to like components. As shown, the housing 404 of the containment device 400 may include a top rim 420, an upper portion 422, a lower portion 424, and a bottom rim 426. The top rim 420 of the housing 404 includes a first diameter. The bottom rim 426 of the housing 404 has a second diameter that is less than the first diameter of the top rim 420. In some implementations, the upper portion 422 of the housing 104 may define a taper 425 toward the lower portion 424 of the housing 104. For example, in some implementations, the upper portion 422 of the housing 404 may include a length L of five inches with a two-inch diameter, before the taper 425 begins.

Figure 5:
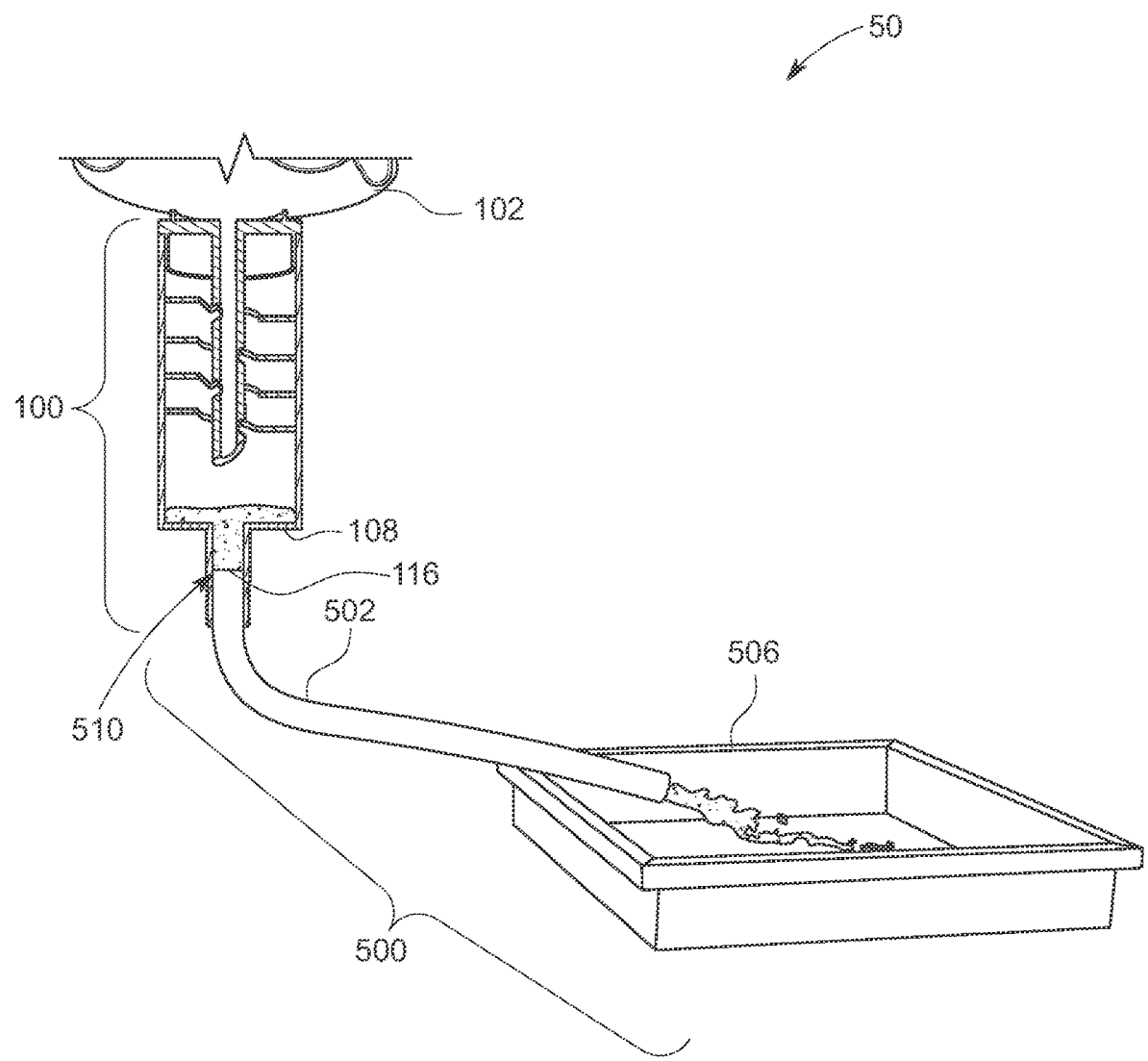
FIG. 5 illustrates a subsequent implementation of the system of FIG. 1 in a third position, according to some implementations of the present disclosure.

Referring now to FIG. 5, an example oil draining system 50 is depicted. The system 50 is the same as, or similar to, the system 10 in FIG. 1, except that the puncture assembly 200 is replaced by the drain assembly 500. In some implementations, the drain assembly 500 may be viewed as a subsequent implementation after FIG. 3B. As such, in some implementations, the drain assembly 500 may be used in the system 10 (FIG. 1) for removing and/or draining oil.

The drain assembly 500 is removably coupled to the containment device 100. Thus, in some implementations, the puncture assembly 200 (FIG. 1) is decoupled from the containment device 100, and the drain assembly 500 is then removably coupled to the containment device 100. This connection between the drain assembly 500 and the containment device 100 is sealed to avoid unnecessary burns or mess due to potential spilling or leaking of oil. The connection between the drain assembly 500 and the containment device 100 may be made using threads, seals, gaskets, or any other mechanism that ensures a removable connection and/or good sealing.

In some implementations, the drain assembly 500 can include a tube 502 and a clip 504. The tube 502 may be used as a controlled attachment to guide oil into a catch pan 506. In some implementations, the tube 502 may have an outer diameter of 7/16 inch. In some implementations, the tube 502 may include a length of 10 inches. In some implementations, the tube 502 may be hollow. In some implementations, the tube 502 is removably coupled to the lower cap 108 of the containment device 100.

The tube 502 may also include an end 510 going into the containment device 100 to ensure oil flow. The end 510 of the tube 502 may include a metal tip in instances where the tube 502 punctures the seal 116 of the lower cap 108. Upon applying pressure to the containment device 100, the oil is released into the drain assembly 500, beginning with the tube 502. The tube 502 may, therefore, be positioned to ensure the removed and/or drained oil is controlled or contained in the catch pan 506. The oil may be handled from the catch pan 506 once fully removed and/or drained from the system 10 for removing and/or draining oil.

Thus, in some implementations, the seal 116 of the lower cap 108 can be reused for at least four times, allowing (i) coupling and decoupling of the puncture assembly 200, and (ii) coupling and decoupling of the tube 502. Further, in some implementations, the tube 502 may include a clip to resist the flow of the oil out of the tube 502, while the clip is attached to the tube 502. Thus, the clip is not depicted in FIG. 5 where the oil flows out of the tube 502.

In some implementations, an oil removal kit includes a containment device (e.g., the containment device 100 or the containment device 400), a puncture assembly (e.g., the puncture assembly 200), and a drain assembly (e.g., the drain assembly 500). In some such implementations, the containment device 100 is coupled to an oil filter 102. The puncture assembly 200 is attached to the containment device 100, opposite the oil filter 102. The puncture device 218 of the puncture assembly 200 punctures the oil filter 102, such that oil may flow from the oil filter 102 into a housing 104 of the containment device 100 (FIGS. 3B-3C). Once the oil has been transferred from the oil filter 102 and into the housing 104 of the containment device 100, the puncture assembly 200 may be disconnected from the containment device 100. Then, the drain assembly 500 may be attached to the containment device 100 (FIG. 5). Once pressure is applied by the tube 502 and/or a rigid end (e.g., the end is sharp or merely more rigid than the seal 116 of the lower cap 108) of the drain assembly 500, the oil flows from the containment device 100 into the drain assembly 500. In some implementations, the oil flows directly into the catch pan 506. Once the oil is completely removed and/or drained from the containment device 100 and into the catch pan 506, a user may dispose of the oil as desired.

Figure 6:
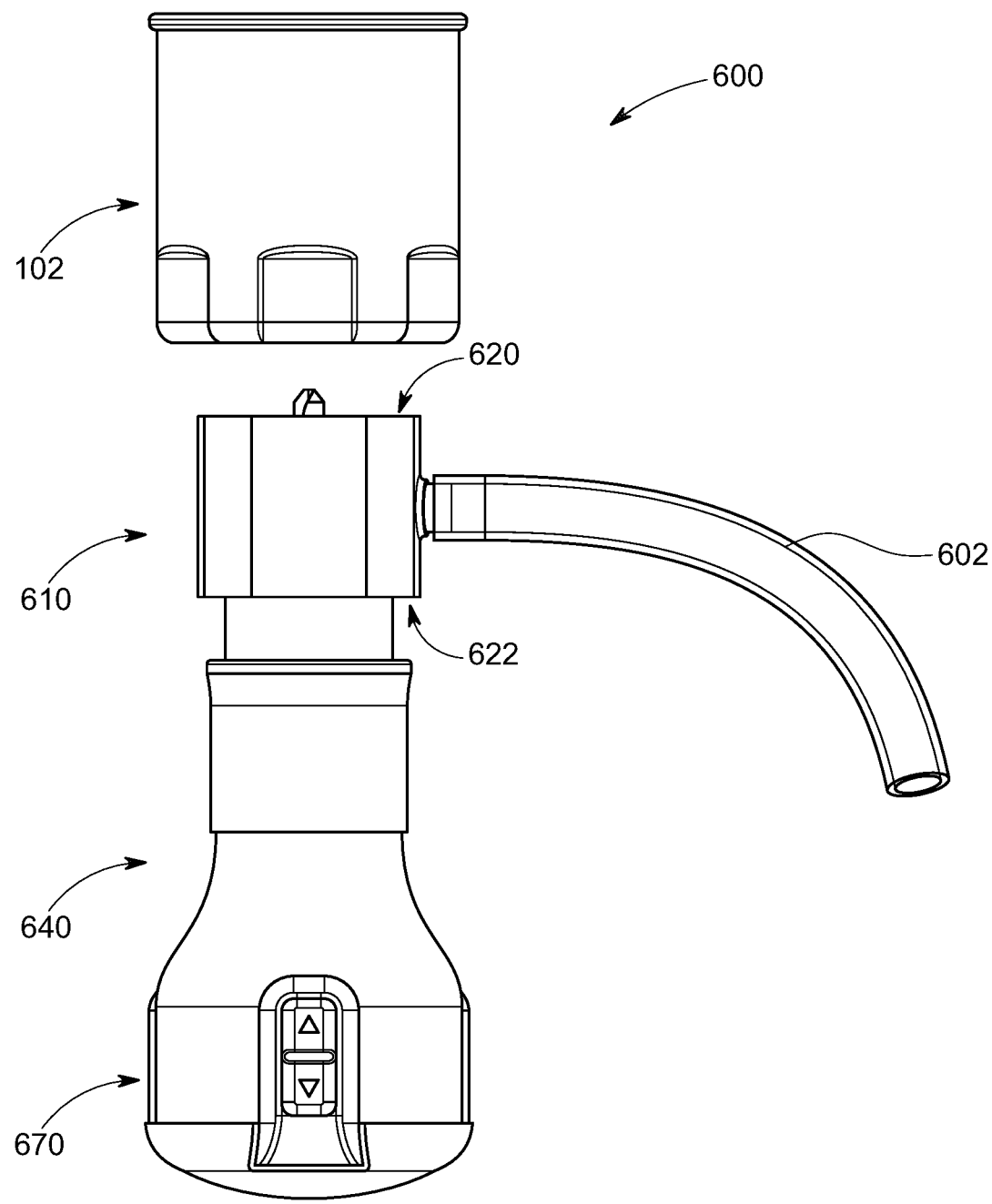
FIG. 6 illustrates a front elevation view of an oil draining system and an oil filter, according to some implementations of the present disclosure.
Figure 7:
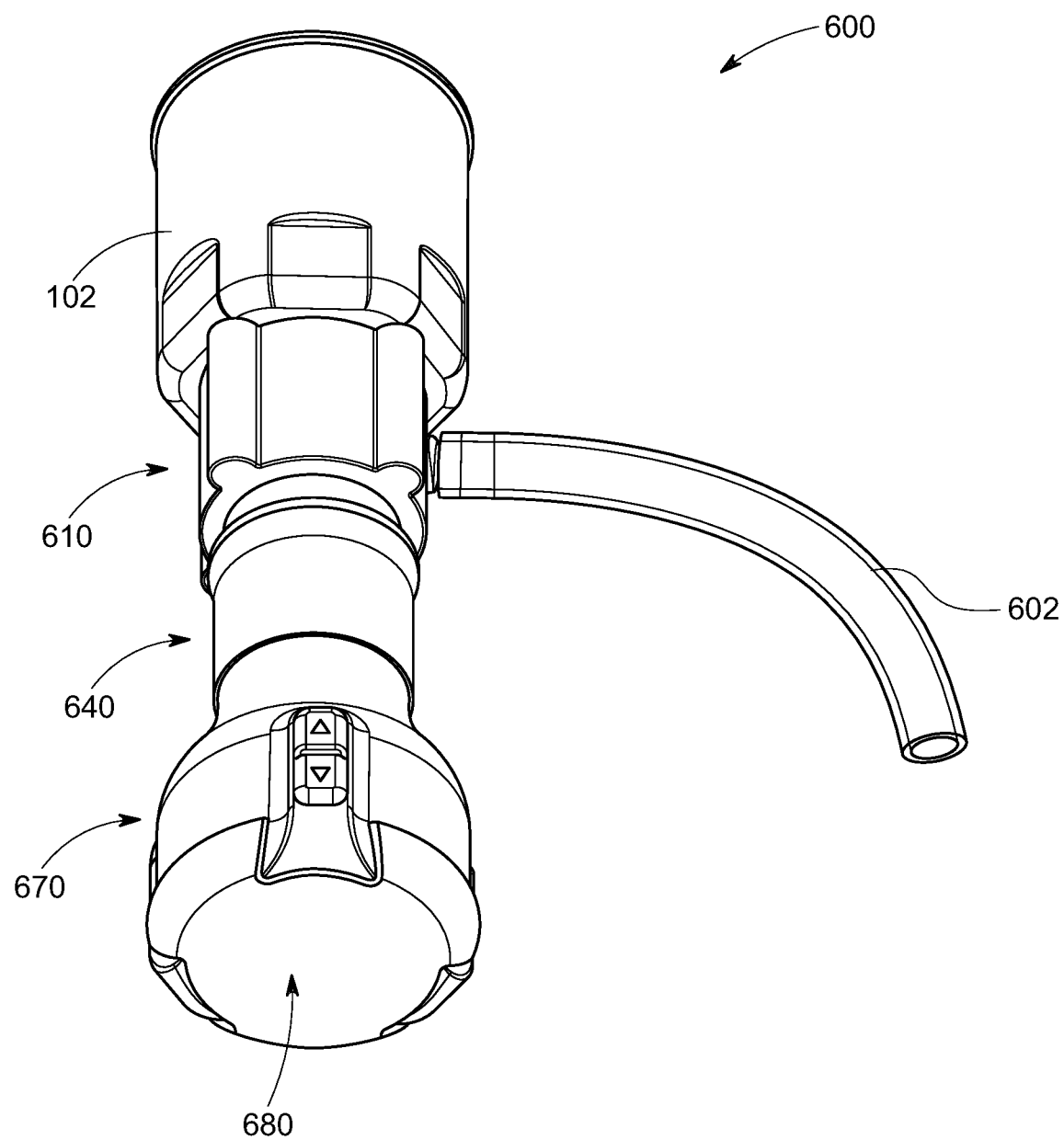
FIG. 7 illustrates a bottom perspective view of the oil draining system of FIG. 6 attached to the oil filter, according to some implementations of the present disclosure.

Referring to FIGS. 6-7, an oil draining system 600 may be used on different styles of oil filters, such as the oil filter 102. Specifically, FIG. 6 illustrates a front plan view of the oil draining system 600; and FIG. 7 illustrates a bottom perspective view of the oil draining system 600. The oil filter 102 may remain installed on a motor vehicle when the oil draining system 600 is being used. From top (i.e., for attachment to the oil filter 102) to bottom, the oil draining system 600 includes an oil catch compartment 610, a motor (or gearbox) compartment 640, and a power compartment 670.

The oil catch compartment 610 includes a first end 620 (top) and a second end 622 (bottom). The first end 620 is configured for coupling to the oil filter 102. A gearbox shaft 646 (FIG. 9B) is coupled to the second end 620 of the oil catch compartment 610 via restrained joints that provide the telescopic connection. For example, in some implementations, the oil catch compartment 610 may fit over a housing of the gearbox shaft 646 as a telescoping sleeve, where the outside diameter of the housing of the gearbox shaft 646 is smaller than the nominal diameter of the oil catch compartment 610, and the outside diameter of a housing of the motor 644 is about the same or larger than the nominal diameter of the oil catch compartment 610.

During operation, the gearbox shaft 646 is capable of extending or contracting relative to the oil catch compartment 610. For a compact oil draining system 600 having a total length of between 5 inches to 10 inches in the first position, the gearbox shaft 646 can contract relative to the oil catch compartment 610 by about 0.3 in to 1 inch, such as by about 0.3 inch, 0.4 inch, 0.5 inch, 0.6 inch, 0.7 inch, 0.8 inch, 0.9 inch, or 1 inch.

Figure 8:
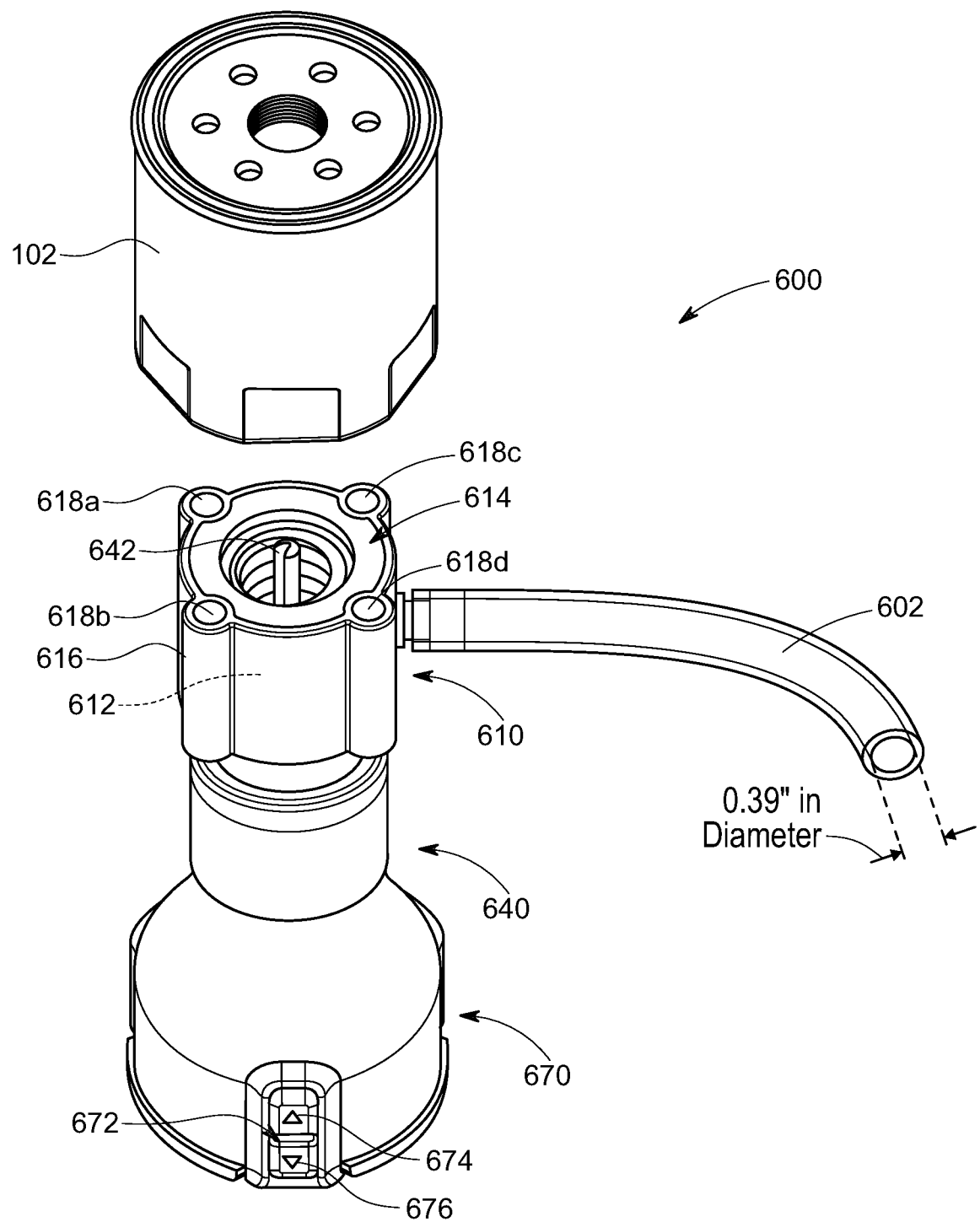
FIG. 8 illustrates a top perspective view of the oil draining system of FIG. 6 at a distance from the oil filter, according to some implementations of the present disclosure.

The oil draining system 600 further includes a drain tube 602 coupled to a side of the oil catch compartment 610, for example, via a protruding opening on a sidewall of the oil catch compartment 610. In some implementations, the drain tube 602 may include a flexible oil hose with any suitable diameter. The drain tube 602 is of any suitable diameter, such as between about 0.2 inch and about 0.5 inch. In some implementations, the drain tube 602 is about 0.3 inch, about 0.4 inch, or about 0.5 inch in diameter. In this example, the drain tube 602 is about 0.39 inch in diameter (FIG. 8). In some implementations, the oil draining system 600 also includes an overmold palm grip 680 coupled to the bottom of the power compartment 670.

Referring to FIG. 8, a top perspective view of the oil draining system 600 is illustrated. The oil catch compartment 610 of the oil draining system 600 is configured to couple to a bottom or a side of an oil filter, depending on the type oil filter. In this example, the oil catch compartment 610 is configured to couple to the bottom of the oil filter 102. In some implementations, the oil catch compartment 610 includes a hollow housing 612, and a rubber gasket seal 614 attached to the top of the housing 612. The rubber gasket seal 606 provides direct contact and a liquid-tight seal with the bottom of the oil filter 102, thereby preventing the oil from leaking at the top rim of the housing 612.

The oil catch compartment 610 further includes a plurality of magnetic studs that holds and/or attaches the oil catch compartment 610 to the bottom of the oil filter 102 (e.g., during puncturing of the oil filter 102 and/or draining of the oil inside the oil filter 102). Each magnetic stud is situated in a corresponding slot of a tubular sleeve 616. In some implementations, the sleeve 616 is made of a flexible and/or stretchy material, which may be removable relative to a hollow rigid housing (e.g., the housing 612) of the oil catch compartment. In this example, the oil catch compartment 610 has four magnetic studs (or rods) 618a, 618b, 618c, and 618d, which are situated in four corresponding slots of the sleeve 616.

Figure 9B:
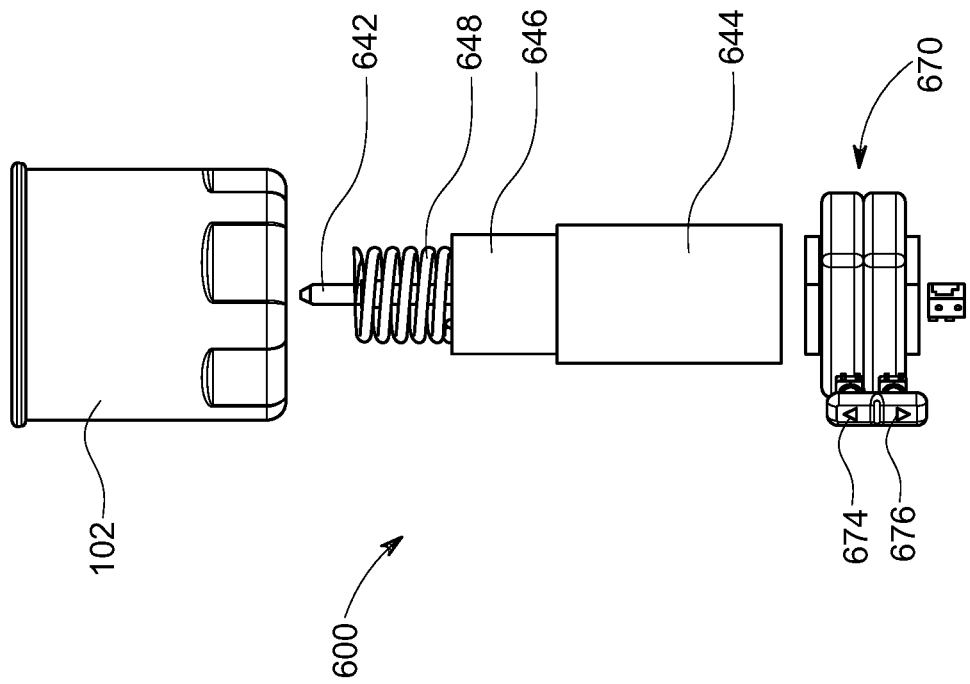
FIG. 9B illustrates a front elevation view of certain internal components of the oil draining system of FIG. 6, according to some implementations of the present disclosure.

In some implementations, the oil draining system 600 includes a motor 644 (FIG. 9B) and a puncturing device 642 attached directly to the motor 644's gearbox shaft 646 (FIG. 9B). As shown, the puncturing device 642 extends from the gearbox shaft 646 through a hollow core of the oil catch compartment 610. In this example, the puncturing device 642 includes a drill bit, an awl, a needle, a pin, etc., or any suitable component that provides sufficient pressure to puncture the oil filter 102. The power compartment 670 includes a power switch 672, which controls the motor 644 and the gearbox shaft 646, thereby driving the puncturing device 642 up or down relative to the oil catch compartment 610. For example, pushing the "up" arrow 674 drives the puncturing device 642 up toward the oil filter 102, and pushing the "down" arrow 676 drives the puncturing device 642 down away from the oil filter 102.

Figure 12B:
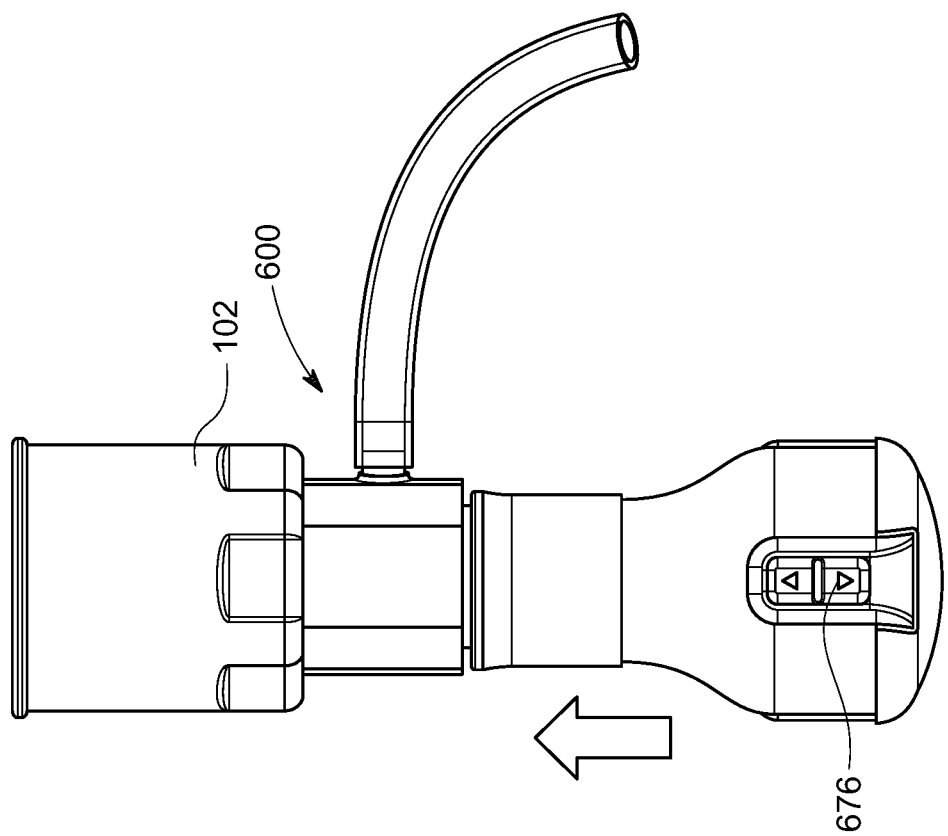
FIG. 12B illustrates the oil draining system of FIG. 6 in a second position during puncturing of the oil filter, according to some implementations of the present disclosure.
Figure 12A:
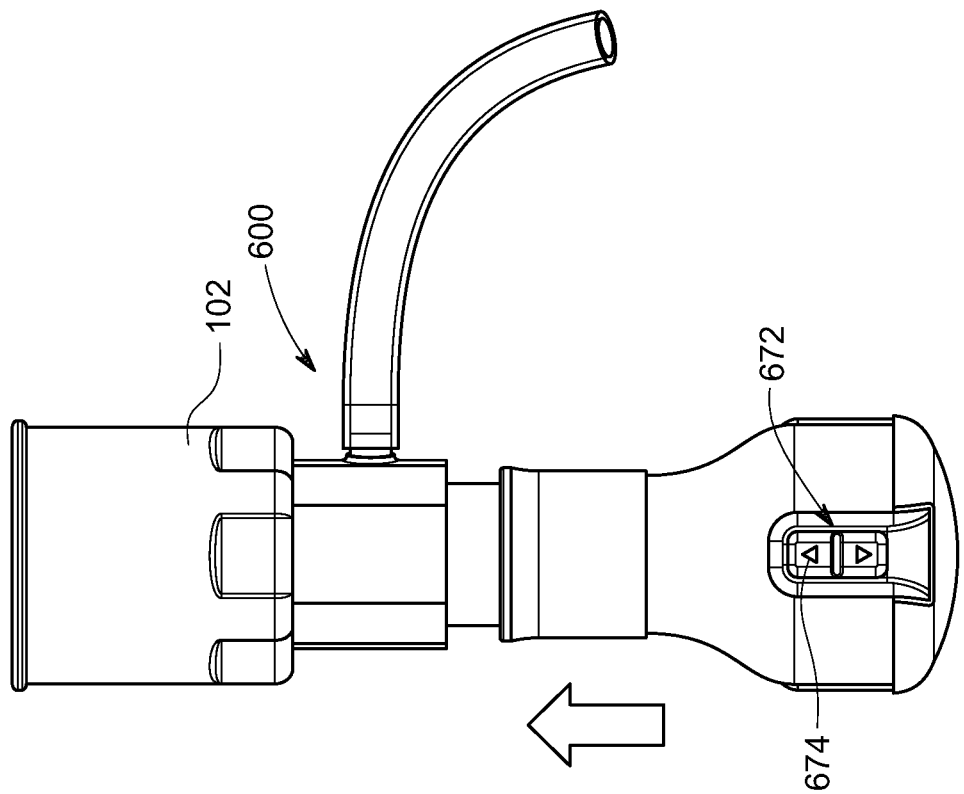
FIG. 12A illustrates the oil draining system of FIG. 6 in a first position before puncturing the oil filter, according to some implementations of the present disclosure.

In some implementations, the puncturing device 642 is housed entirely within the oil catch compartment 610, when the puncturing device 642 is driven all the way down and the oil draining system 600 is in a first position (FIG. 12A). In some implementations, at least a portion of the puncturing device 642 extends through the top of the oil catch compartment 610, when the puncturing device 642 is driven all the way up and the oil draining system 600 is in a second position (FIG. 12B). When the oil draining system 600 is in the second position while coupled (e.g., attached) to the oil filter 102, the puncturing device 642 punctures through the bottom of the oil filter 102.

Figure 9A:
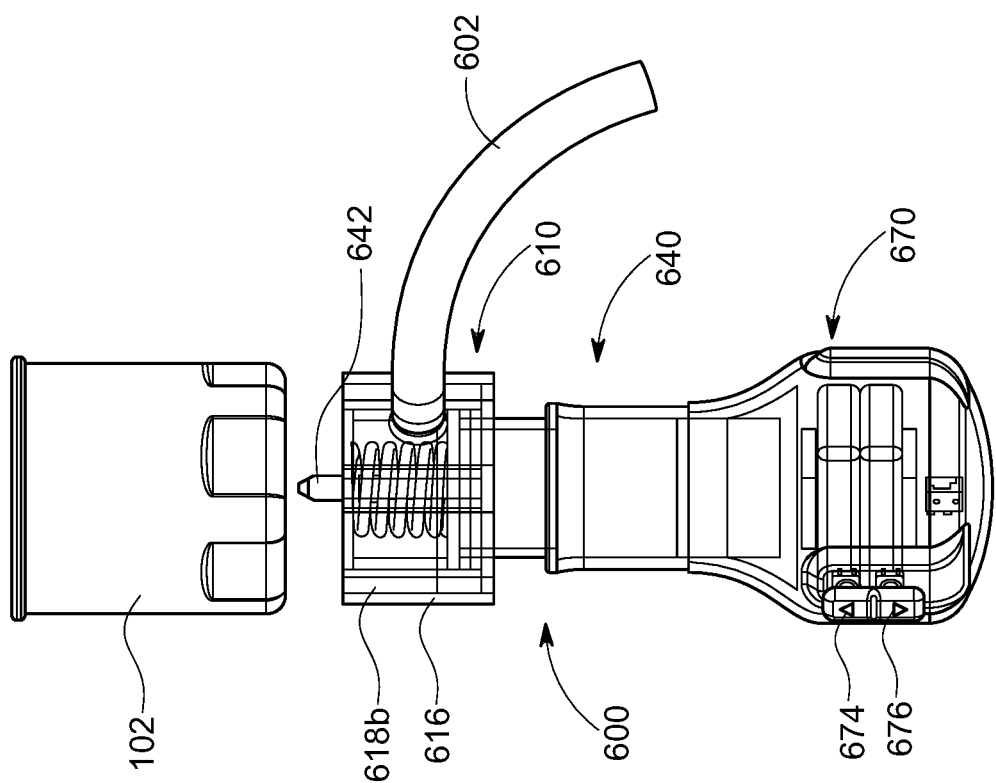
FIG. 9A illustrates a partially transparent view of the oil draining system of FIG. 6, according to some implementations of the present disclosure.

FIG. 9A illustrates a partially transparent view of the oil draining system 600, according to some implementations of the present disclosure. The oil draining system 600 shown in FIG. 9A is the same as, or similar to, the oil draining system 600 shown in FIGS. 6-8, where identical reference numerals designate identical elements. The motor (or gearbox) compartment 640 includes the motor 644, the gearbox shaft 646, and the puncturing device 642. In this view, the puncturing device 642 has been driven all the way up, and the oil draining system 600 is advancing towards the second position. A portion of the puncturing device 642 extends through the top of the oil catch compartment 610. While the oil draining system 600 is depicted in FIG. 9A to be in between the first position (FIG. 12A) and the second position (FIG. 12B), in this example the oil catch compartment 610 is not coupled (or attached) to the oil filter 102 for illustration purposes. During normal use, the oil catch compartment 610 is coupled (or attached) to the oil filter 102 when the oil draining system 600 is advancing from the first position toward the second position.

FIG. 9B illustrates a front elevation view of certain internal components of the oil draining system 600, according to some implementations of the present disclosure. The oil draining system 600 shown in FIG. 9B is the same as, or similar to, the oil draining system 600 shown in FIGS. 6-9A, where identical reference numerals designate identical elements. In addition, FIG. 9B is the same as, or similar to, FIG. 9A, except that FIG. 9B shows the inner workings enclosed by the housings of the oil catch compartment 610, the motor (or gearbox) compartment 640, and the power compartment 670. As described herein, a user may push the "up" arrow 674 or the "down" arrow 676 of the power compartment 670 to control the motor 644 and the gearbox shaft 646, thereby driving the puncturing device 642 up or down relative to the oil catch compartment 610 (FIG. 9A).

In some implementations, the motor (or gearbox) compartment 640 further includes a coil 648 extending upwards from the gearbox shaft 646. In some such implementations, the coil 648 is mechanically connected or secured to the puncturing device 642, and aids in driving the puncturing device 642 up or down. For example, the coil 648 may be configured to rotate the puncturing device 642 in a clockwise or counterclockwise direction, which in turn drives the puncturing device 642 up or down. Additionally or alternatively, in some implementations, the coil 648 aids in protecting and/or centering the puncturing device 642 during movement. In some other implementations, the coil 648 is a compression spring that is configured to push against the oil filter 102 to aid in disengaging and/or retracting the puncturing device 642 from the oil filter 102, after the oil filter 102 is punctured.

Figure 10:
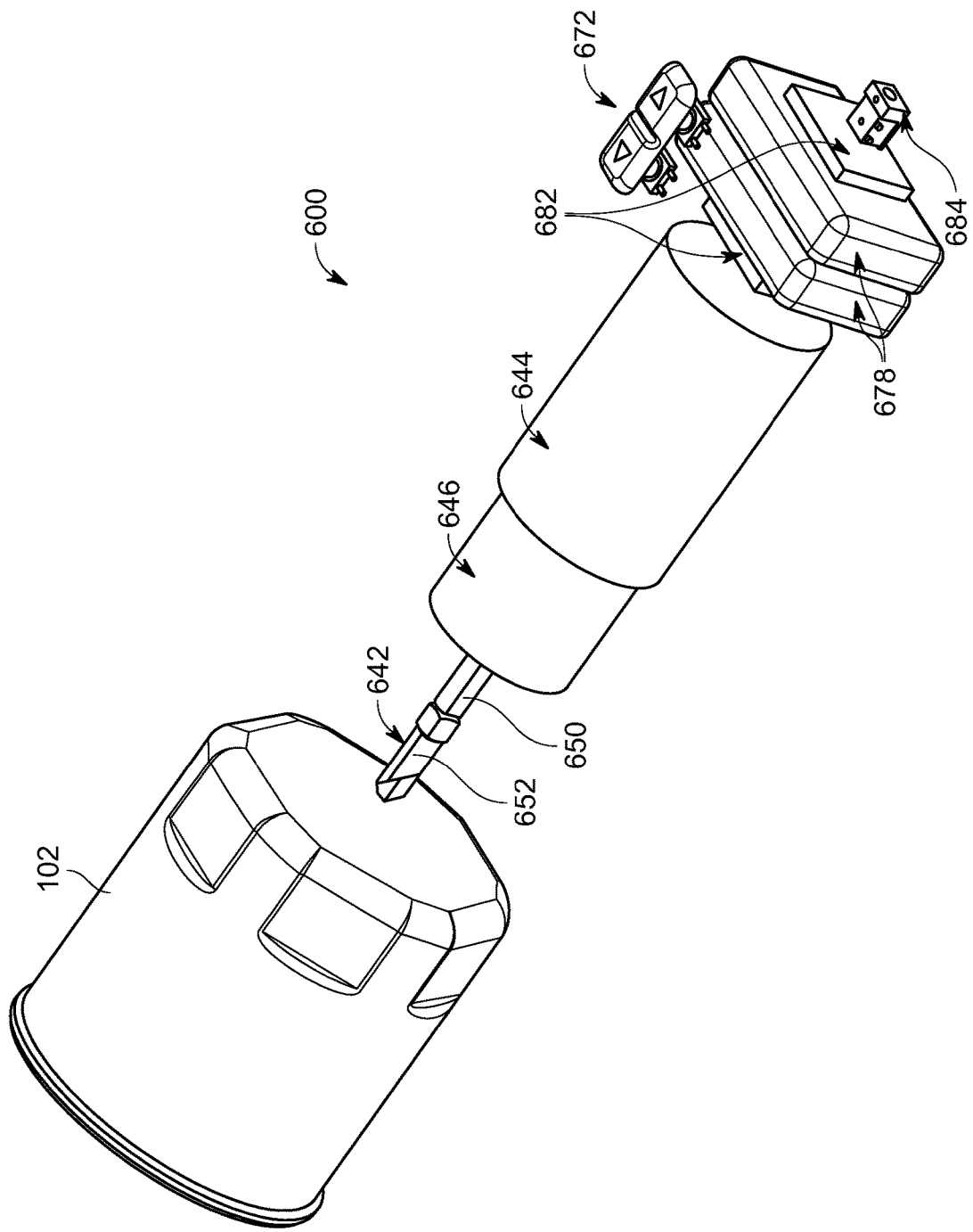
FIG. 10 illustrates a side perspective view of certain internal components of the oil draining system of FIG. 6, according to some implementations of the present disclosure.

FIG. 10 illustrates a side perspective view of certain internal components of the oil draining system 600, according to some implementations of the present disclosure. The oil draining system 600 shown in FIG. 10 is the same as, or similar to, the oil draining system 600 shown in FIGS. 6-9B, where identical reference numerals designate identical elements. As shown, the power switch 672 is configured to control the motor 644 and the gearbox shaft 646. As shown, the puncturing device 642 includes a rod 650 and the drill bit 652. The drill bit 652 and the gearbox shaft 646 are coupled to opposing ends of the rod 650. In some implementations, the drill bit 652 may be removed from the rod 650 for service and/or replacement, as it might get worn after repeated puncturing of oil filters.

In some implementations, the motor 644 is a DC motor powered by a battery 678. In this example, the battery 678 includes a stack of two lithium polymer (Li-Po) batteries. In some implementations, the battery 678 is rechargeable via a DC power jack socket 684. In this example, the battery 678 is coupled to, and positioned between, a pair of charging module boards 682 with battery protection capabilities. In some implementations, the gearbox shaft 646 is telescopically coupled to the oil catch compartment 610. For example, in some implementations, the gearbox shaft 646 is configured to move in and out of the inside of the oil catch compartment 610, as the oil draining system 600 moves between the first position and the second position.

Figure 11:
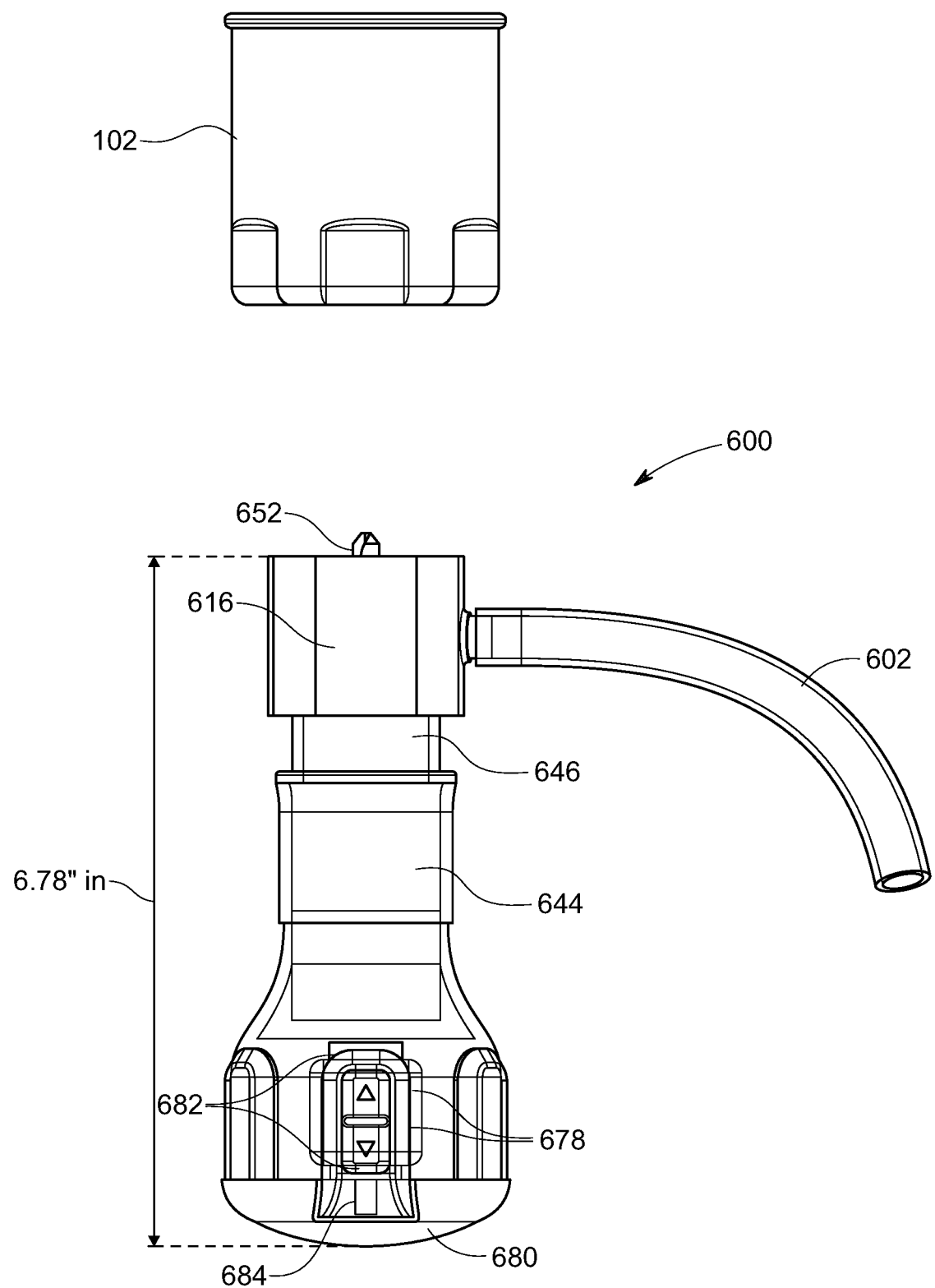
FIG. 11 illustrates another partially transparent view of the oil draining system of FIG. 6, according to some implementations of the present disclosure.

FIG. 11 illustrates another partially transparent view of the oil draining system 600, according to some implementations of the present disclosure. The oil draining system 600 shown in FIG. 11 is the same as, or similar to, the oil draining system 600 shown in FIGS. 6-10, where identical reference numerals designate identical elements. In this view, at least a portion of the drill bit 652 extends through the top of the oil catch compartment 610. In some implementations, the oil draining system 600 is a compact system having a total length of between about 5 inches to about 10 inches when the oil draining system 600 is in the first position, such as about 5 inches, about 6 inches, about 7 inches, about 8 inches, about 9 inches, or about 10 inches. The total length of the oil draining system 600 decreases by a small amount when the oil draining system 600 is in the second position, such as by about 0.3 inch, 0.4 inch, 0.5 inch, 0.6 inch, 0.7 inch, 0.8 inch, 0.9 inch, or 1 inch. As shown, in this example, the total length of the oil draining system 600 is about 6.78 inches when the oil draining system 600 is in between the first position and the second position.

Figure 12C:
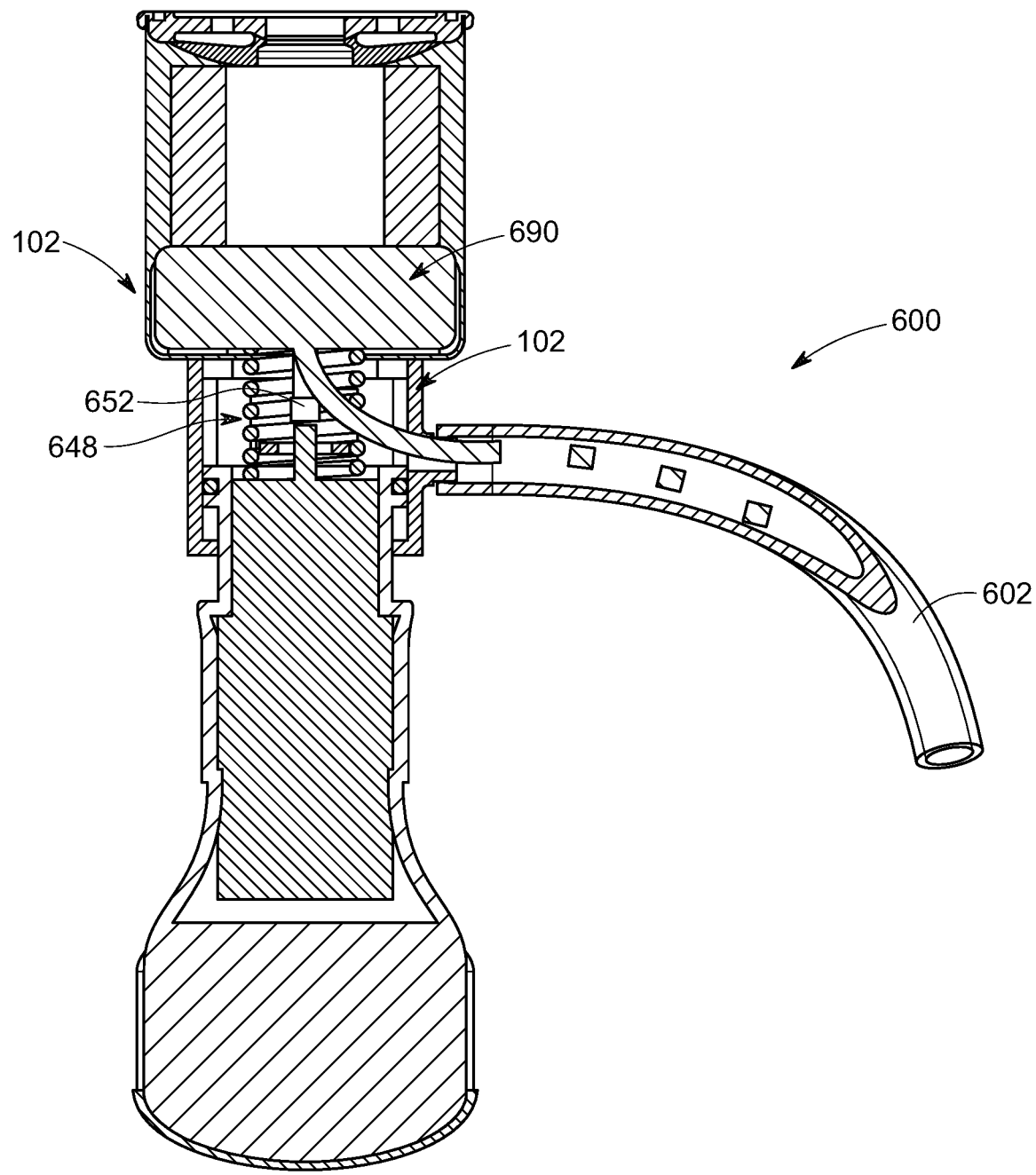
FIG. 12C illustrates a vertical cross-sectional view of the oil draining system of FIG. 6 receiving and draining oil from the oil filter, according to some implementations of the present disclosure.

An example process of using the oil draining system 600 is illustrated via FIGS. 12A-12C. The oil draining system 600 shown in FIG. 12A-12C is the same as, or similar to, the oil draining system 600 shown in FIGS. 6-11, where identical reference numerals designate identical elements. FIG. 12A illustrates the oil draining system 600 in the first position before puncturing the oil filter 102, according to some implementations of the present disclosure. A user attaches the oil draining system 600 to the oil filter 102, where the magnetic studs or rods (e.g., 618a-618d in FIG. 8) hold the oil draining system 600 to the oil filter 102, and the rubber gasket seal 606 (FIG. 8) provides direct contact and a liquid-tight seal with the bottom of the oil filter 102. At this point, the oil filter 102 is not punctured, and the oil remains within the oil filter 102.

Once the oil draining system 600 is attached to the oil filter 102, the user pushes the "up" arrow 674 of the power switch 672 to drive the puncturing device 642 (FIG. 8) upwards, and causes the drill bit 652 (FIG. 10) to puncture the oil filter 102. At this point, the user may firmly push the oil draining system 600 against the oil filter 102 to ensure proper attachment and the liquid-tight seal. FIG. 12B illustrates the oil draining system 600 in the second position during puncturing of the oil filter 102, according to some implementations of the present disclosure. While it is depicted in FIG. 12B that the oil draining system 600 is fully in the second position, in some use cases, the oil draining system 600 does not have to advance fully to the second position. For example, in FIG. 9A, the oil draining system 600 is in between the first position and the second position, but the puncturing device 642 protrudes enough from the first end 620 (FIG. 6) of the oil catch compartment 610, the puncturing device 642 may already provide enough pressure to puncture the oil filter 102, thus can stop there without further advancing.

Once the drill bit 652 (FIG. 10) punctured the oil filter 102, and penetrated into the oil filter 102 enough, the user can let the coil 648 (e.g., compression spring) (FIG. 9B) inside the oil catch compartment 610 push against the oil filter 102 and disengage the drill bit 652. Additionally or alternatively, in some implementations, such as if the drill bit 652 still stayed attached to the oil filter 102 and did not detach easily, the user pushes the reverse switch (i.e., the "down" arrow 676), which detaches the drill bit 652 from the oil filter 102. The detached view is illustrated in FIG. 12C, which also shows the oil draining system 600 receiving and draining the oil from the oil filter 102.

As shown in FIG. 12C, the drill bit 652 has detached from the oil filter 102, and retracted entirely into the oil catch compartment 610. Oil 690 is being drained from the oil filter 120, into the oil catch compartment 610, and out of the drain tube 602. While the oil 690 is shown flowing directly from the oil filter 102 to the drain tube 602, the oil 690 may drain first into the oil catch compartment 610, and then flow out to drain tube 602. As such, the oil 690 is drained in a controlled manner, which significantly reduces or eliminates any hazardous oil spills.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to limit the invention. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A system comprising:
    an oil catch compartment having a first end and a second end, the first end configured for coupling to an oil filter;
    at least one magnetic stud or rod positioned along a sidewall of the oil catch compartment;
    a motor compartment including:
        a gearbox shaft telescopically coupled to the second end of the oil catch compartment; and
        a puncturing device coupled to the gearbox shaft and positioned at least partially within the gearbox shaft of the motor compartment or the oil catch compartment; and
    a switch formed on an outside surface of a battery compartment and communicatively connected to a motor coupled to the gearbox shaft, the switch being actuatable to cause the motor to advance the puncturing device via the gearbox shaft, such that the puncturing device alternates between (i) a first position that is retracted from the first end of the oil catch compartment and (ii) a second position that protrudes from the first end of the oil catch compartment.

2. The system of claim 1, further comprising a flexible oil hose coupled to the sidewall of the oil catch compartment.

3. The system of claim 2, wherein the flexible oil hose is removably coupled to the oil catch compartment.

4. The system of claim 1, wherein the oil catch compartment includes a protruding opening for attaching a flexible oil hose, the protruding opening being formed on the sidewall of the oil catch compartment.

5. The system of claim 1, wherein the switch is actuatable to cause the puncturing device to rotate, thereby advancing the puncturing device.

6. The system of claim 1, wherein the puncturing device includes a drill bit, wherein the puncturing device further includes a rod that is coupled to the drill bit and the gearbox shaft at two opposing ends of the rod, and wherein at the first position the drill bit is housed entirely within the oil catch compartment.

7. The system of claim 1, wherein the sidewall extends from the first end to the second end of the oil catch compartment.

8. The system of claim 1, further comprising a tubular sleeve having a corresponding slot for receiving each of the at least one magnetic stud or rod.

9. The system of claim 8, wherein at least a portion of the tubular sleeve includes at least a portion of the sidewall of the oil catch compartment.

10. The system of claim 8, wherein the tubular sleeve is configured to wrap outside the sidewall of the oil catch compartment.

11. The system of claim 1, wherein the sidewall of the oil catch compartment forms a hollow housing.

12. The system of claim 11, further comprising a rubber gasket seal coupled to a top of the hollow housing, the rubber gasket seal being configured to provide direct contact and a liquid-tight seal with the oil filter.

13. The system of claim 1, wherein the motor compartment further includes a compression spring coupled to the gearbox shaft and enclosing at least a portion of the puncturing device, the compression spring being configured to urge the puncturing device to return to the first position from the second position.

14. A method for draining oil from an oil filter, the method comprising:
    attaching a first end of an oil catch compartment of an oil draining system to the oil filter;
    allowing at least one magnetic stud or rod of the oil draining system to hold onto the oil filter, the at least one magnetic stud or rod positioned along a sidewall of the oil catch compartment of the oil draining system; and
    actuating a switch to cause a motor to advance a puncturing device of the oil draining system via a gearbox shaft, such that the puncturing device alternates from a first position that is retracted from the first end of the oil catch compartment to a second position that protrudes from the first end of the oil catch compartment.

15. The method of claim 14, further comprising retracting the puncturing device from the second position to the first position, thereby allowing oil to drain from the oil filter to the oil catch compartment.

16. The method of claim 15, wherein the oil draining system further includes a flexible oil hose coupled to the sidewall of the oil catch compartment, such that the oil further drains out of the flexible oil hose.

17. The method of claim 15, wherein the switch further causes the puncturing device to retract from the second position to the first position.

18. The method of claim 15, wherein the oil draining system further includes a compression spring coupled to the gearbox shaft and enclosing at least a portion of the puncturing device, the compression spring being configured to urge the puncturing device to retract to the first position from the second position.

19. The method of claim 14, wherein the gearbox shaft is telescopically coupled to a second end of the oil catch compartment.

20. The method of claim 14, wherein the puncturing device includes a rod that is coupled to a drill bit and the gearbox shaft at two opposing ends of the rod; and wherein at the first position the drill bit is housed entirely within the oil catch compartment.

* * * * *